US012675099B2

(12) United States Patent
Kilfoy et al.

(10) Patent No.: US 12,675,099 B2
(45) Date of Patent: Jul. 7, 2026

(54) INDUSTRIAL CONTROL PROGRAM COMPONENT EXPLORATION AND PLAYBACK

(71) Applicant: Rockwell Automation Technologies, Inc., Mayfield Heights, OH (US)

(72) Inventors: Leo T Kilfoy, San Diego, CA (US); Michael J Tresh, Manchester, NH (US); Bruce T. McCleave, Jr., Mission Viejo, CA (US); Daniel C. Rischar, Mayfield Heights, OH (US); Stephen C. Briant, Moon Township, PA (US); Ryan P. Dunn, Mayfield Heights, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 303 days.

(21) Appl. No.: 18/343,986

(22) Filed: Jun. 29, 2023

(65) Prior Publication Data
US 2025/0004454 A1 Jan. 2, 2025

(51) Int. Cl.
*G05B 19/418* (2006.01)
(52) U.S. Cl.
CPC ... *G05B 19/41865* (2013.01); *G05B 19/4185* (2013.01)
(58) Field of Classification Search
CPC .......... G05B 19/41865; G05B 19/4185; G05B 19/41885
See application file for complete search history.

(56) References Cited

U.S. PATENT DOCUMENTS

| | | | |
|---|---|---|---|
| 7,971,151 B2 * | 6/2011 | Nixon | H04L 67/12 |
| | | | 700/83 |
| 10,333,820 B1 * | 6/2019 | Wang | H04L 45/02 |
| 11,074,322 B1 | 7/2021 | R. et al. | |

(Continued)

OTHER PUBLICATIONS

European Search Report for European Application No. EP24184638, dated Dec. 12, 2024.

(Continued)

*Primary Examiner* — Christopher E. Everett
(74) *Attorney, Agent, or Firm* — Amin, Turocy & Watson, LLP

(57) ABSTRACT

A cloud-based Industrial Development Hub (IDH) supports development and testing capabilities for industrial customers that are easy to use and offered as a service. The IDH comprises an enhanced storage platform and associated design tools—collectively referred to as the Vault—which serves as a repository on which customers can store control project code, device configurations, and other digital aspects of an industrial automation project. The IDH system can facilitate discovery and management of digital content associated with control systems, and can be used for system backup and restore, code conversion, and version management. In addition, the IDH includes analytic tools that can analyze industrial control projects submitted by user and generate project telemetry data based on the analysis. The system can translate this project telemetry data to various types of relational maps that visualized dependencies between data producers and consumers from a control standpoint.

20 Claims, 19 Drawing Sheets

(56)                References Cited

U.S. PATENT DOCUMENTS

| | | | |
|---|---|---|---|
| 2007/0203846 A1 | 8/2007 | Kavuri et al. | |
| 2008/0077512 A1* | 3/2008 | Grewal | G06F 11/1448 |
| | | | 705/28 |
| 2009/0089701 A1* | 4/2009 | Baier | G06Q 10/06 |
| | | | 715/772 |
| 2009/0327942 A1* | 12/2009 | Eldridge | G06F 8/34 |
| | | | 715/771 |
| 2011/0191255 A1 | 8/2011 | Sowell | |
| 2013/0036001 A1 | 2/2013 | Wegner et al. | |
| 2013/0081045 A1 | 3/2013 | Jeong | |
| 2014/0164607 A1 | 6/2014 | Bai et al. | |
| 2014/0288998 A1 | 9/2014 | Paray | |
| 2015/0281319 A1* | 10/2015 | Maturana | G05B 19/4185 |
| | | | 709/202 |
| 2021/0255611 A1 | 8/2021 | McGregor | |
| 2022/0100171 A1* | 3/2022 | Miller | G06N 20/00 |
| 2022/0100181 A1 | 3/2022 | Mcgregor | |
| 2022/0283784 A1 | 9/2022 | Degen et al. | |
| 2022/0311794 A1 | 9/2022 | Maya et al. | |
| 2022/0404800 A1* | 12/2022 | Amaro, Jr. | G05B 19/4184 |
| 2023/0342435 A1 | 10/2023 | Patange et al. | |

OTHER PUBLICATIONS

Final Office Action received for U.S. Appl. No. 18/355,581, dated Feb. 21, 2025.
Non-Final Office Action received for U.S. Appl. No. 18/355,581, dated Oct. 22, 2024, 33 pages.
Non-Final Office Action received for U.S. Appl. No. 18/343,961, dated Aug. 15, 2025, 12 pages.
Non-Final Office Action received for U.S. Appl. No. 18/350,058, dated Aug. 28, 2025, 13 pages.
Final Office Action received for U.S. Appl. No. 18/343,961 dated Jan. 16, 2026, 14 pages.
Notice of Allowance received for U.S. Appl. No. 18/350,058 dated Jan. 9, 2026, 7 pages.
Non-Final Office Action received for U.S. Appl. No. 18/357,311 dated Jan. 7, 2026, 19 pages.
"Token Licensing Concepts and Management", IBM, Apr. 2020, pp. 1-12.
"OpenLM Token-based Licenses—OpenLM Software License Management", The Wayback Machine, 2022, 6 pages.
Notice of Allowance received for U.S. Appl. No. 8/343,961 dated May 4, 2026, 36 pages.

* cited by examiner

IDH
REPOSITORY
SYSTEM

202

326 — VENDOR REPOSITORY

316 — DEVICE PROFILES

318 — APPS.

· · ·

802 — PROJECT TELEMETRY

DEVICES IN USE
MODULES IN USE
I/O UTILIZATION
NETWORK UTILIZATION
DEVICE USAGE FREQUENCY
MEMORY UTILIZATION

· · ·

208 — PROJECT TELEMETRY COMPONENT

306 — CONTROL PROJECT

CONTROL CODE
DEVICE CONFIGURATIONS
VISUALIZATION

Figure 10:
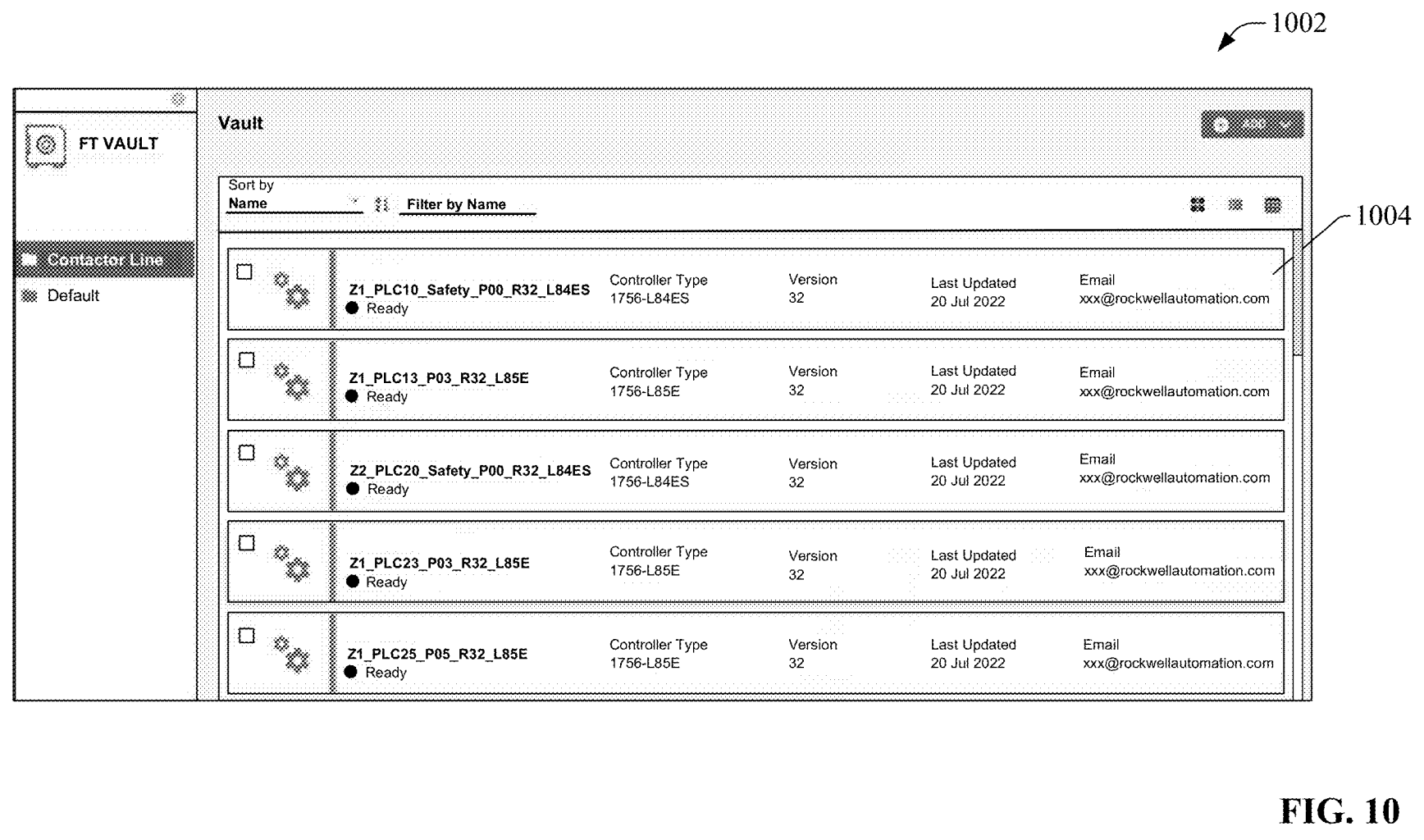

FT VAULT

Vault

Default

Sort by
Name

Filter by Name

Z1_PLC10_Safety_P00_R32_L84ES
● Ready

Controller Type
1756-L84ES

Version
32

Last Updated
20 Jul 2022

Email
xxx@rockwellautomation.com

Z1_PLC13_P03_R32_L85E
● Ready

Controller Type
1756-L85E

Version
32

Last Updated
20 Jul 2022

Email
xxx@rockwellautomation.com

Z2_PLC20_Safety_P00_R32_L84ES
● Ready

Controller Type
1756-L84ES

Version
32

Last Updated
20 Jul 2022

Email
xxx@rockwellautomation.com

Z1_PLC23_P03_R32_L85E
● Ready

Controller Type
1756-L85E

Version
32

Last Updated
20 Jul 2022

Email
xxx@rockwellautomation.com

Z1_PLC25_P05_R32_L85E
● Ready

Controller Type
1756-L85E

Version
32

Last Updated
20 Jul 2022

Email
xxx@rockwellautomation.com

1002

1004

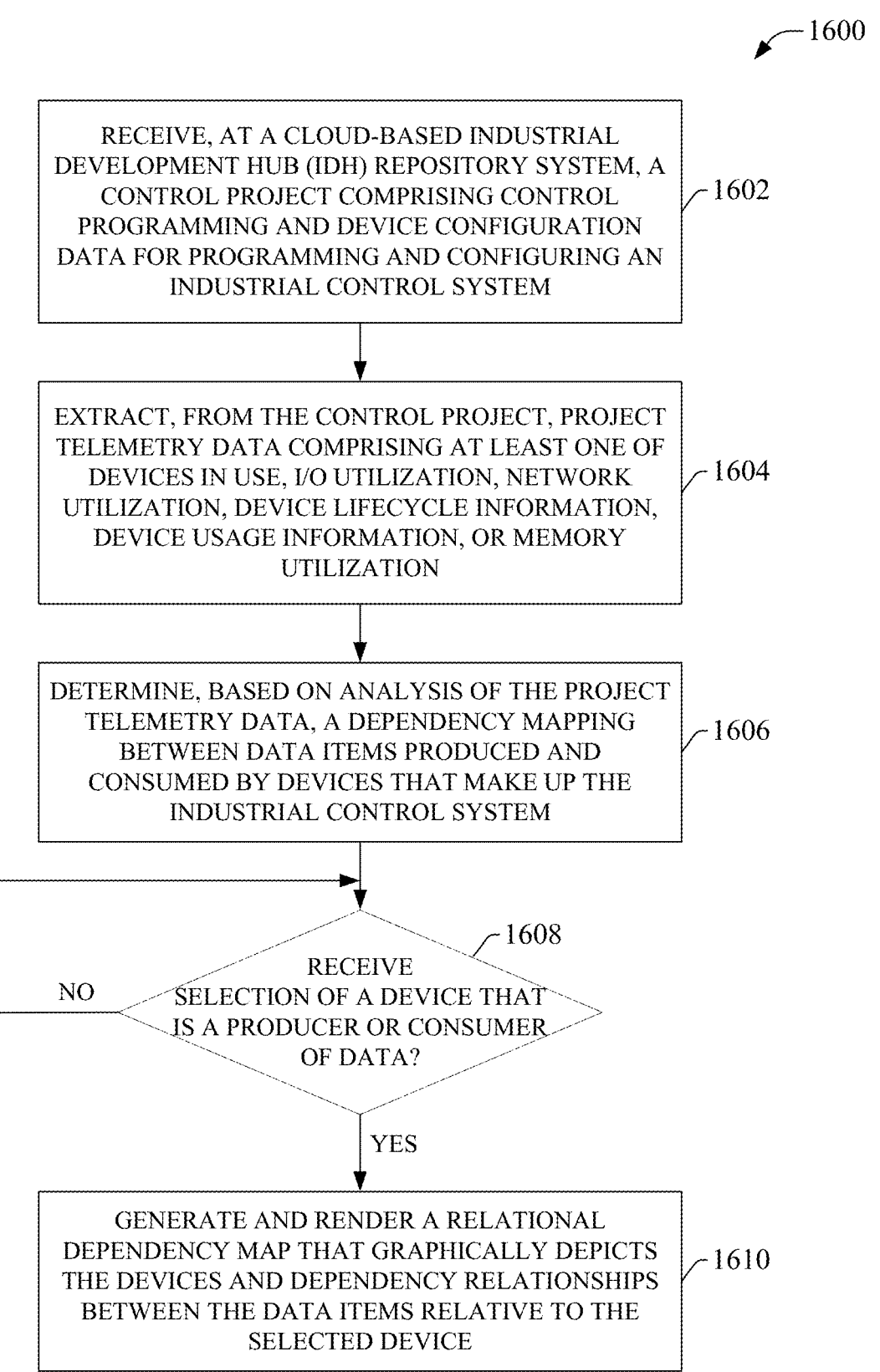

1600

RECEIVE, AT A CLOUD-BASED INDUSTRIAL DEVELOPMENT HUB (IDH) REPOSITORY SYSTEM, A CONTROL PROJECT COMPRISING CONTROL PROGRAMMING AND DEVICE CONFIGURATION DATA FOR PROGRAMMING AND CONFIGURING AN INDUSTRIAL CONTROL SYSTEM — 1602

EXTRACT, FROM THE CONTROL PROJECT, PROJECT TELEMETRY DATA COMPRISING AT LEAST ONE OF DEVICES IN USE, I/O UTILIZATION, NETWORK UTILIZATION, DEVICE LIFECYCLE INFORMATION, DEVICE USAGE INFORMATION, OR MEMORY UTILIZATION — 1604

DETERMINE, BASED ON ANALYSIS OF THE PROJECT TELEMETRY DATA, A DEPENDENCY MAPPING BETWEEN DATA ITEMS PRODUCED AND CONSUMED BY DEVICES THAT MAKE UP THE INDUSTRIAL CONTROL SYSTEM — 1606

RECEIVE SELECTION OF A DEVICE THAT IS A PRODUCER OR CONSUMER OF DATA? — 1608

NO

YES

GENERATE AND RENDER A RELATIONAL DEPENDENCY MAP THAT GRAPHICALLY DEPICTS THE DEVICES AND DEPENDENCY RELATIONSHIPS BETWEEN THE DATA ITEMS RELATIVE TO THE SELECTED DEVICE — 1610

FIG. 16

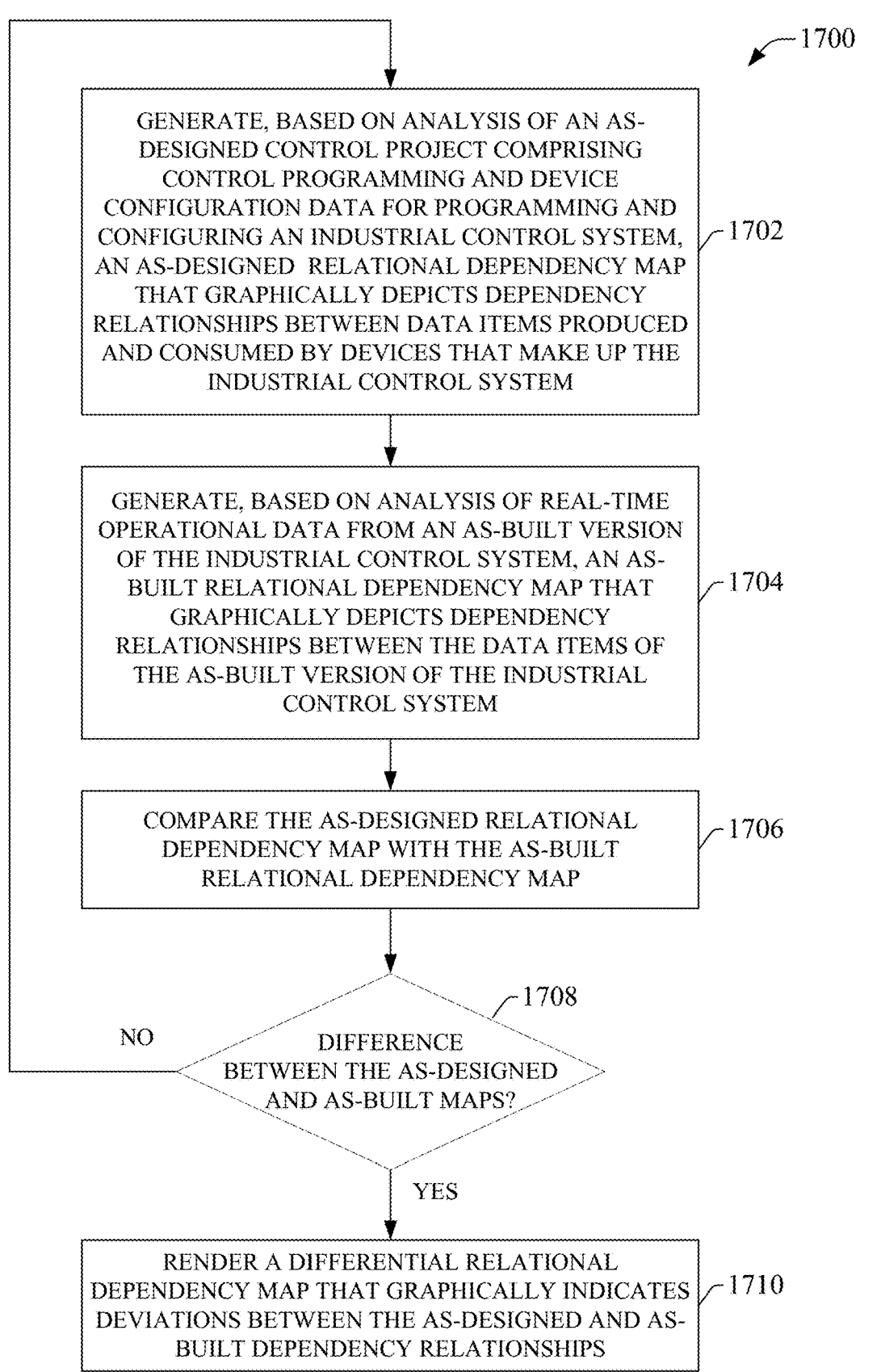

1700

GENERATE, BASED ON ANALYSIS OF AN AS-DESIGNED CONTROL PROJECT COMPRISING CONTROL PROGRAMMING AND DEVICE CONFIGURATION DATA FOR PROGRAMMING AND CONFIGURING AN INDUSTRIAL CONTROL SYSTEM, AN AS-DESIGNED RELATIONAL DEPENDENCY MAP THAT GRAPHICALLY DEPICTS DEPENDENCY RELATIONSHIPS BETWEEN DATA ITEMS PRODUCED AND CONSUMED BY DEVICES THAT MAKE UP THE INDUSTRIAL CONTROL SYSTEM

1702

GENERATE, BASED ON ANALYSIS OF REAL-TIME OPERATIONAL DATA FROM AN AS-BUILT VERSION OF THE INDUSTRIAL CONTROL SYSTEM, AN AS-BUILT RELATIONAL DEPENDENCY MAP THAT GRAPHICALLY DEPICTS DEPENDENCY RELATIONSHIPS BETWEEN THE DATA ITEMS OF THE AS-BUILT VERSION OF THE INDUSTRIAL CONTROL SYSTEM

1704

COMPARE THE AS-DESIGNED RELATIONAL DEPENDENCY MAP WITH THE AS-BUILT RELATIONAL DEPENDENCY MAP

1706

1708

DIFFERENCE BETWEEN THE AS-DESIGNED AND AS-BUILT MAPS?

NO

YES

RENDER A DIFFERENTIAL RELATIONAL DEPENDENCY MAP THAT GRAPHICALLY INDICATES DEVIATIONS BETWEEN THE AS-DESIGNED AND AS-BUILT DEPENDENCY RELATIONSHIPS

INDUSTRIAL CONTROL PROGRAM COMPONENT EXPLORATION AND PLAYBACK

TECHNICAL FIELD

The subject matter disclosed herein relates generally to industrial automation systems, and, for example, to industrial information services.

BACKGROUND ART

Industrial automation systems can be disparate and complex, and typically integrate with many physical devices that generate and exchange data in connection with monitoring and controlling a manufacturing process. This challenging environment can make development of control systems difficult, resulting in long development cycles in which new control system designs are developed, tested, and finally deployed.

Also, while there are potential benefits to be gained from accurate and granular documentation of the data connections between data consumers and data producers on the plant floor, the complex data interactions between industrial devices and systems renders the task of documenting these data connections difficult.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system is provided, comprising a user interface component configured to receive, via a cloud platform, an industrial control project comprising at least control programming and device configuration data that, in response to execution on one or more industrial devices, facilitate monitoring and control of an industrial automation system; a project telemetry component configured to generate project telemetry data based on analysis of the industrial control project, the project telemetry data defining characteristics of the one or more industrial devices inferred based on the analysis; and a project analysis component configured to determine, based on analysis of the project telemetry data, dependencies between entities that make up the industrial automation system, wherein the user interface component is further configured to render, on a client device, a relational dependency map that graphically displays the dependencies.

Also, one or more embodiments provide a method, comprising receiving, by a system comprising a processor via a cloud platform, an industrial control project comprising at least control programming and device configuration data that, in response to execution on one or more industrial devices, facilitate monitoring and control of an industrial automation system; generating, by the system, project telemetry data based on analysis of the industrial control project, the project telemetry data defining characteristics of the one or more industrial devices identified based on the analysis; determining, by the system based on analysis of the project telemetry data, dependencies between entities that make up the industrial automation system; and rendering, by the system on a client device, a relational dependency map that graphically displays the dependencies.

Also, according to one or more embodiments, a non-transitory computer-readable medium is provided having stored thereon instructions that, in response to execution, cause a system comprising a processor to perform operations, the operations comprising receiving, via a cloud platform, an industrial control project comprising at least control programming and device configuration data that, in response to execution on one or more industrial devices, facilitate monitoring and control of an industrial automation system; generating project telemetry data based on analysis of the industrial control project, the project telemetry data defining characteristics of the one or more industrial devices identified based on the analysis; determining, based on analysis of the project telemetry data, dependencies between hardware or software entities of the industrial automation system; and displaying, on a client device, a relational dependency map that graphically displays the dependencies based on the determining.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 10 is an example display screen that lists the industrial controllers that make up an automation system represented by a control project.

FIG. 16 is a flowchart of an example methodology for rendering data dependencies within an industrial automation system.

FIG. 17 is a flowchart of an example methodology for graphically depicting differences in data dependencies between an as-designed industrial control system and an as-built control system.

DETAILED DESCRIPTION

Figure 1:
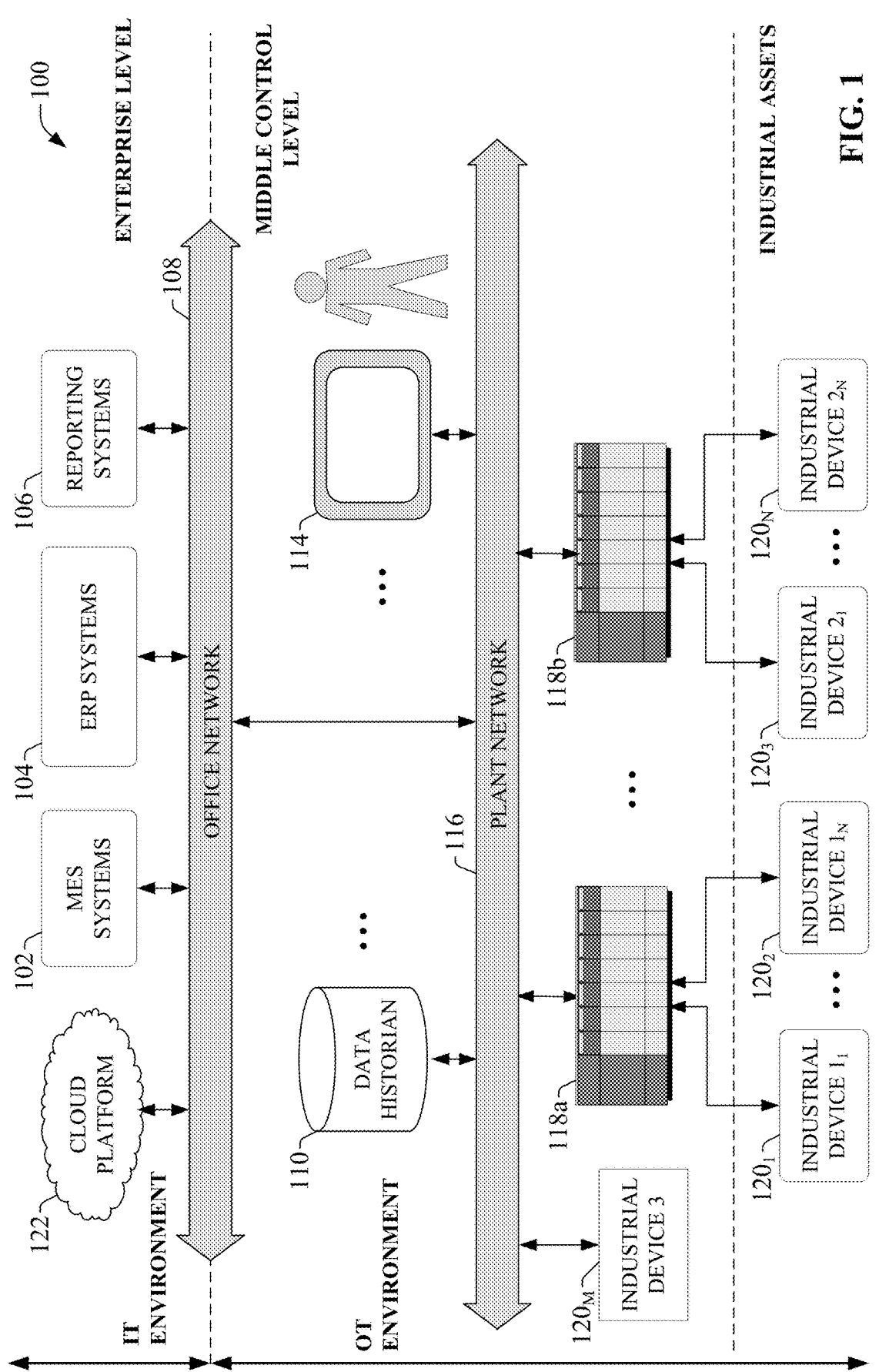
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components.

While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer, on a server blade, or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, structured text, C++, Python, Javascript, etc.

Industrial devices 120 may include input devices that provide data relating to the controlled industrial systems to the industrial controllers 118, output devices that respond to control signals generated by the industrial controllers 118 to control aspects of the industrial systems, or devices that act as both input and output devices. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired connections or over wired or wireless networks. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, EtherNet/IP, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. Such higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level given higher-level business considerations. Reporting systems 106 can collect operational data from industrial devices on the plant floor and generate daily or shift reports that summarize operational statistics of the controlled industrial assets.

OT level systems can be disparate and complex, and may integrate with many physical devices. This challenging environment can make development of control systems on the OT level difficult, resulting in long development cycles in which new control system designs are developed, tested, and finally deployed. Also, while there are potential benefits to be gained from accurate and granular documentation of the data connections between data consumers and data producers on the plant floor, the complex data interactions between industrial devices and systems renders the task of documenting these data connections difficult.

To address these and other issues, one or more embodiments described herein provide a cloud-based Industrial Development Hub (IDH) that supports development and testing capabilities for industrial customers that are easy to use and offered as a service. The IDH comprises an enhanced storage platform and associated design tools—collectively referred to as the Vault—which serves as a repository on which customers can store control project code, device configurations, and other digital aspects of an industrial automation project. The IDH system can facilitate discovery and management of digital content associated with control systems, and can be used for system backup and restore, code conversion, and version management. In addition, the IDH includes analytic tools that can analyze industrial control projects submitted by user and generate project telemetry data based on the analysis. The system can leverage this project telemetry data to generate various types of relational maps that visualize dependencies between data producers and consumers from a control standpoint.

Figure 2:
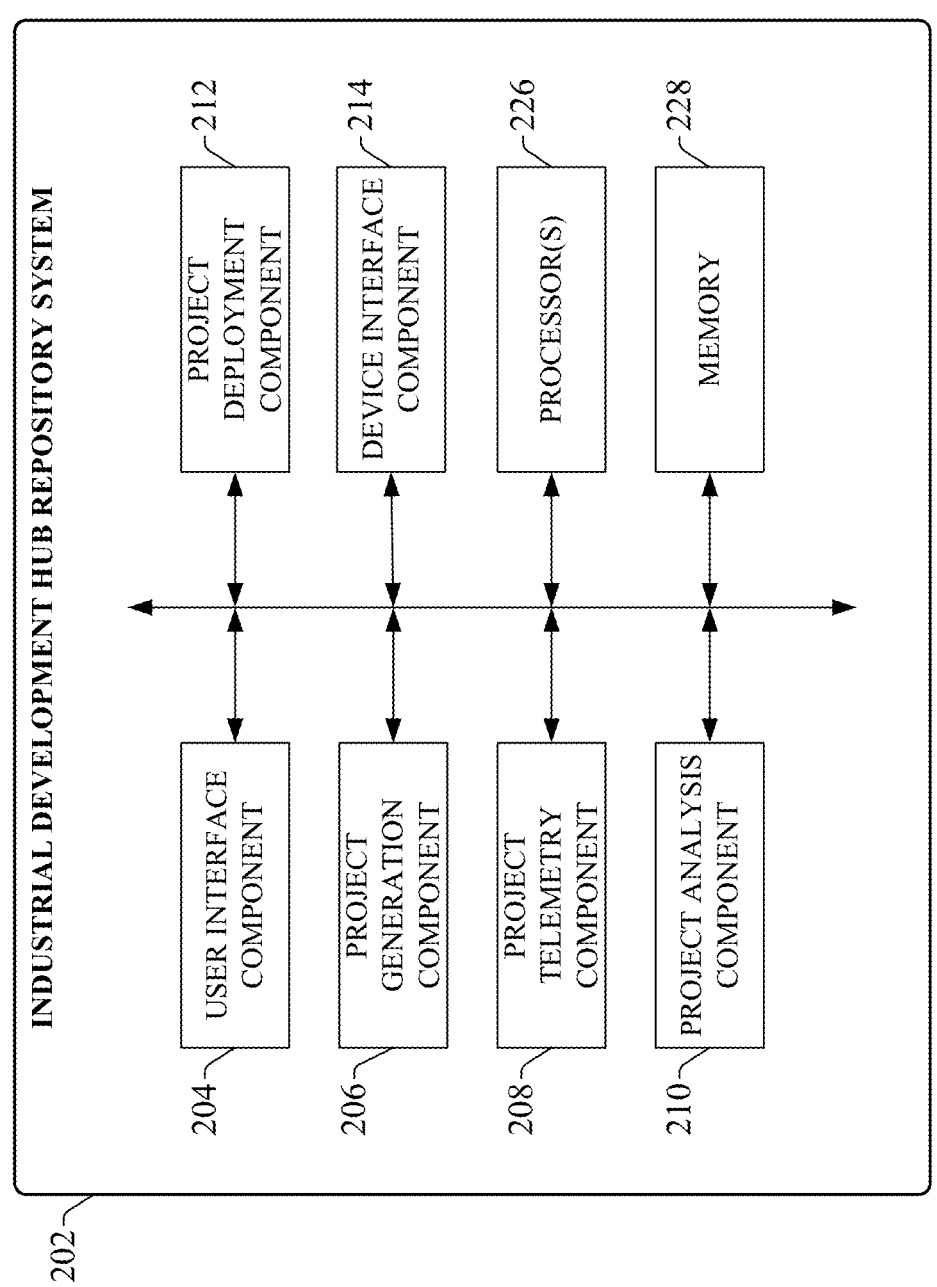
FIG. 2 is a block diagram of an example industrial development hub (IDH) repository system.

FIG. 2 is a block diagram of an example industrial development hub (IDH) repository system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDH repository system 202 can include a user interface component 204, a project generation component 206, a project telemetry component 208, a project analysis component 210, a project deployment component 212, a device interface component 214, one or more processors 226, and memory 228. In various embodiments, one or more of the user interface component 204, project generation component 206, project telemetry component 208, project analysis component 210, project deployment component 212, device interface component 214, the one or more processors 226, and memory 228 can be electrically and/or communicatively coupled to one another to perform one or more of the functions of the IDH repository system 202. In some embodiments, components 204, 206, 208, 210, 212, and 214 can comprise software instructions stored on memory 228 and executed by processor(s) 226. IDH repository system 202 may also interact with other hardware and/or software components not depicted in FIG. 2. For example, processor(s) 226 may interact with one or more external user interface devices, such as a keyboard, a mouse, a display monitor, a touchscreen, or other such interface devices.

IDH repository system 202 can be implemented on a cloud platform as a set of cloud-based services to facilitate access by a diverse range of users having business or technical relationships, including industrial equipment owners (e.g., industrial enterprise entities or plant owners), equipment vendors, original equipment manufacturers (OEMs), system integrators, or other such user entities. The cloud platform on which the system 202 executes can be any infrastructure that allows shared computing services to be accessed and utilized by cloud-capable devices. The cloud platform can be a public cloud accessible via the Internet by devices having Internet connectivity and appropriate authorizations to utilize the IDH repository services. In some scenarios, the cloud platform can be provided by a cloud provider as a platform-as-a-service (PaaS), and the IDH repository system 202 can reside and execute on the cloud platform as a cloud-based service. In some such configurations, access to the cloud platform and associated IDH repository services can be provided to customers as a subscription service by an owner of the IDH repository system 202. Alternatively, the cloud platform can be a private cloud operated internally by the industrial enterprise (the owner of the plant facility). An example private cloud platform can comprise a set of servers hosting the IDH repository system 202 and residing on a corporate network protected by a firewall.

User interface component 204 can be configured to receive user input and to render output to the user in any suitable format (e.g., visual, audio, tactile, etc.). In some embodiments, user interface component 204 can be configured to communicatively interface with a client device (e.g., a laptop computer, tablet computer, smart phone, etc.) that is communicatively connected to the IDH repository system 202 (e.g., via a hardwired or wireless connection). The user interface component 204 can then serve an IDH interface environment to the client device, through which the system 202 receives user input data and renders output data. In other embodiments, user interface component 204 can be configured to generate and serve suitable interface screens to the client device (e.g., program development screens, project submission screens, analysis result screens, etc.), and exchange data via these interface screens. Input data that can be received via various embodiments of user interface component 204 can include, but is not limited to, programming code (including industrial control programming, such as ladder logic programming), device configuration data, engineering drawings, HMI applications, or other such input. Output data rendered by various embodiments of user interface component 204 can include program code, programming feedback (e.g., error and highlighting, coding suggestions, etc.), control project telemetry and recommendations, project testing results, various types of relational maps, or other such outputs.

Project generation component 206 can be configured to create a control system project comprising one or more project files based on design input received via the user interface component 204, as well as industrial knowledge, predefined code modules, and asset models maintained by the IDH repository system 202. The control system project can comprise one or more of industrial control code (e.g., ladder logic, structured text, function block diagrams, etc.), HMI applications comprising one or more HMI interface screen definitions, device configuration files, or other such project files.

Project telemetry component 208 can be configured to analyze an industrial control project submitted by a user and generate project telemetry, or statistical information, for the submitted project based on the analysis. Example project telemetry data that can be generated by the project telemetry component 208 can include, but is not limited to, an inventory of devices used in the project, information regarding how the devices are being used, reports indicating how close to hardware or software capacity limitations the devices or associated software will be operating, how much memory or energy is expected to be consumed by the project during runtime, or other such statistics.

Project analysis component 210 can be configured to analyze the project telemetry data generated by the project telemetry component 208 and generate design recommendations or warnings based on this analysis. Project analysis component 210 can also generate relational mapping information that can be translated to a graphical relational map by the user interface component 204 for rendering on a client device.

Project deployment component 212 can be configured to a system project submitted to, or developed on, the IDH repository system 202 to executable control code that can be exported to, and executed on, selected industrial controllers. Device interface component 214 can be configured to receive real-time operational and status data from industrial devices that make up an automation system during runtime, and to deploy control commands to selected devices of the automation system.

The one or more processors 226 can perform one or more of the functions described herein with reference to the systems and/or methods disclosed. Memory 228 can be a computer-readable storage medium storing computer-executable instructions and/or information for performing the functions described herein with reference to the systems and/or methods disclosed.

Figure 3:
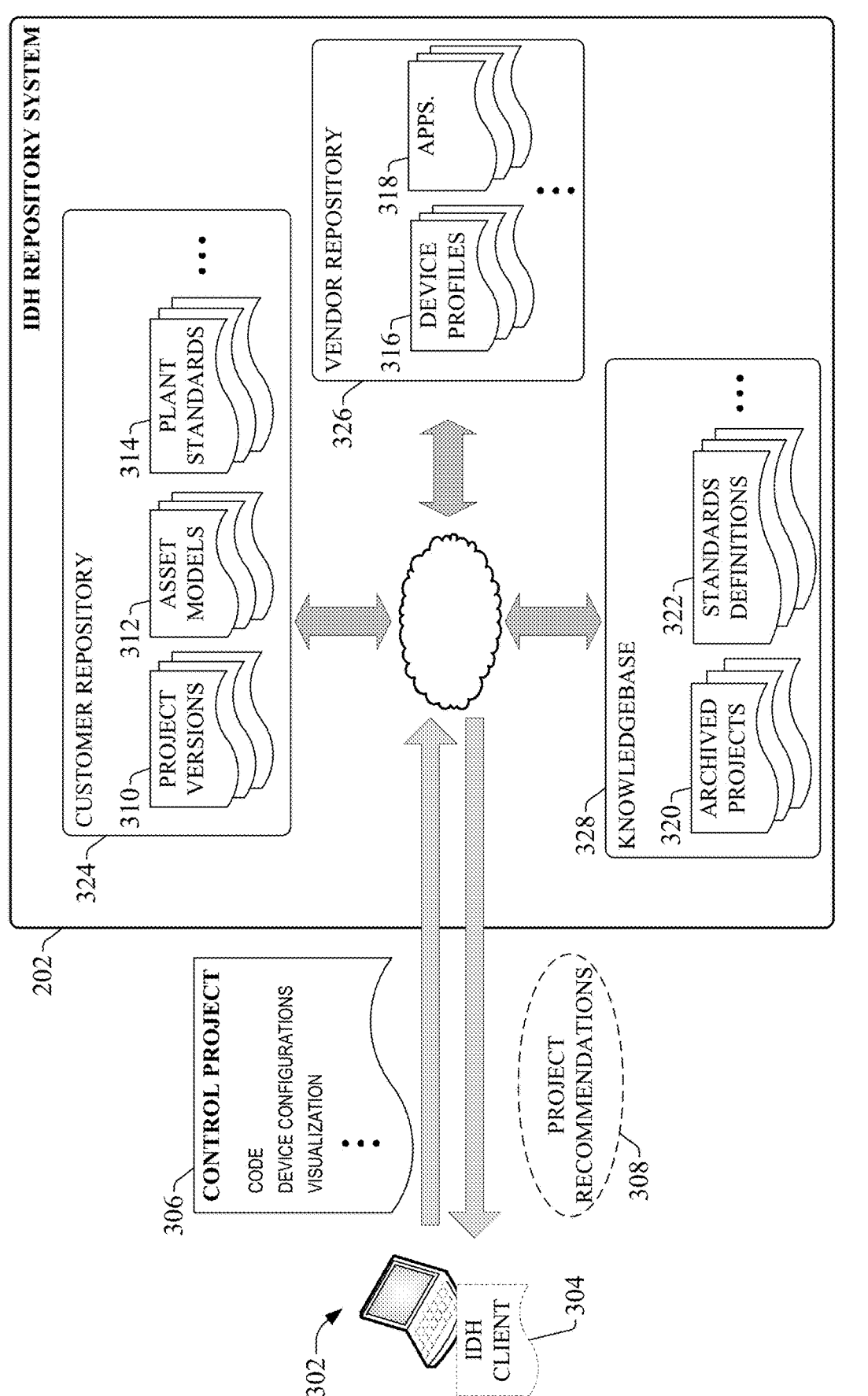
FIG. 3 is a diagram illustrating a generalized architecture of the IDH repository system.

FIG. 3 is a diagram illustrating a generalized architecture of the IDH repository system 202 according to one or more embodiments. As noted above, IDH repository system 202 can execute on a cloud platform as a set of cloud-based storage, analysis, and project editing services. A client device 302 (e.g., a laptop computer, tablet computer, desktop computer, mobile device, wearable AR/VR appliance, etc.) can access the repository system's project development and analysis tools and leverage these tools to either upload or create a control project for an automation system being developed. To this end, the system's user interface component 204 can remotely serve an IDH client 304 to the client device 302. The IDH client 304 comprises a number of interface displays that serve as an interface to the system 202.

Using the tools offered by the repository system 202, the user can submit a control project 306 to the repository system 202. In general, a control project 306 comprises digital data or files that, when executed on corresponding industrial devices deployed within an industrial environment, facilitate monitoring and control of an automation system or industrial process. Control project 306 can comprise control code intended for execution on an industrial controller (e.g., ladder logic, sequential function charts, structured text, function block diagrams, etc.), device configuration data (e.g., industrial controller configuration files, motor drive configuration files, etc.), visualization applications (e.g., HMI applications, AR/VR content, etc.), or other such control project data. In some scenarios, control project 306 may also comprise engineering documentation for its associated automation system, including engineering drawings (e.g., CAD files), support documents, maintenance plans, or other such documentation. In some scenarios in which the design tools offered by the IDH repository system 202 are used to perform project development, control project 306 can be submitted as ongoing project development input; e.g., as control code submitted to the repository system 202 as a designer is writing the code. Alternatively, users can submit completed control projects to the repository for storage, analysis, and feedback. Both scenarios will be described in more detail herein.

In addition to serving as a cloud-based storage for submitted control project 306, repository system 202 can apply a variety of analytics to the submitted control project 306 and generate project recommendations 308 for improving aspects of the submitted control project. This analysis can be based on customer-specific and vendor-specific information contained in a customer repository 324 and a vendor repository 326 maintained on the repository system 202, as well as general industrial expertise stored in a knowledgebase 328.

Repository system 202 can maintain multiple customer repositories 324 designated for respective different end user entities (e.g., equipment or plant owners, industrial enterprises, etc.). Owners of industrial assets can submit and archive project versions 310 in their designated customer repositories 324. Users can also define customized plant standards 314, which can be stored in the customer repository 324 and applied to submitted control projects to ensure that the projects comply with the defined standards. Customer repository 324 can also store digital asset models 312 corresponding to industrial assets in use at the customer facility. These asset models 312 can be used for a variety of purposes, including but not limited to digital simulations of the submitted control project.

The repository system 202 can also analyze submitted control project 306 based on vendor-specific data submitted by equipment or device vendors and stored on one or more vendor repositories 326. In addition to the customer repository 324, repository system 202 can maintain multiple vendor repositories 326 assigned to respective different equipment vendors or OEMs. Vendors can submit device profiles 316 or other types of digital models of their equipment or devices for storage in their designated vendor repository 326. These device profiles 316 can be used in connection with building a digital twin of a customer's automation system or plant environment, or to compare a customer's usage of their equipment with defined equipment capacities. Vendors can also submit and store applications 318 or code segments that can be executed in connection with operation of their equipment (e.g., control logic, HMI interface displays, reporting tools, etc.).

The submitted control project 306 can also be analyzed in view of other archived projects 320 submitted by other customers and deemed similar to the submitted project. This analysis may be useful for identifying portions of the submitted control project 306—e.g., code used to program a particular type of industrial machine or procedure—that deviate from more common approaches used by other designers. Knowledgebase 328 can also store a number of industry-specific standards definitions 322 against which the submitted control project 306 can be checked. Other types of information can be stored and managed by the repository system in the various storage designations and used to analyze and optimize submitted control project data, as will be described herein.

Figure 4:
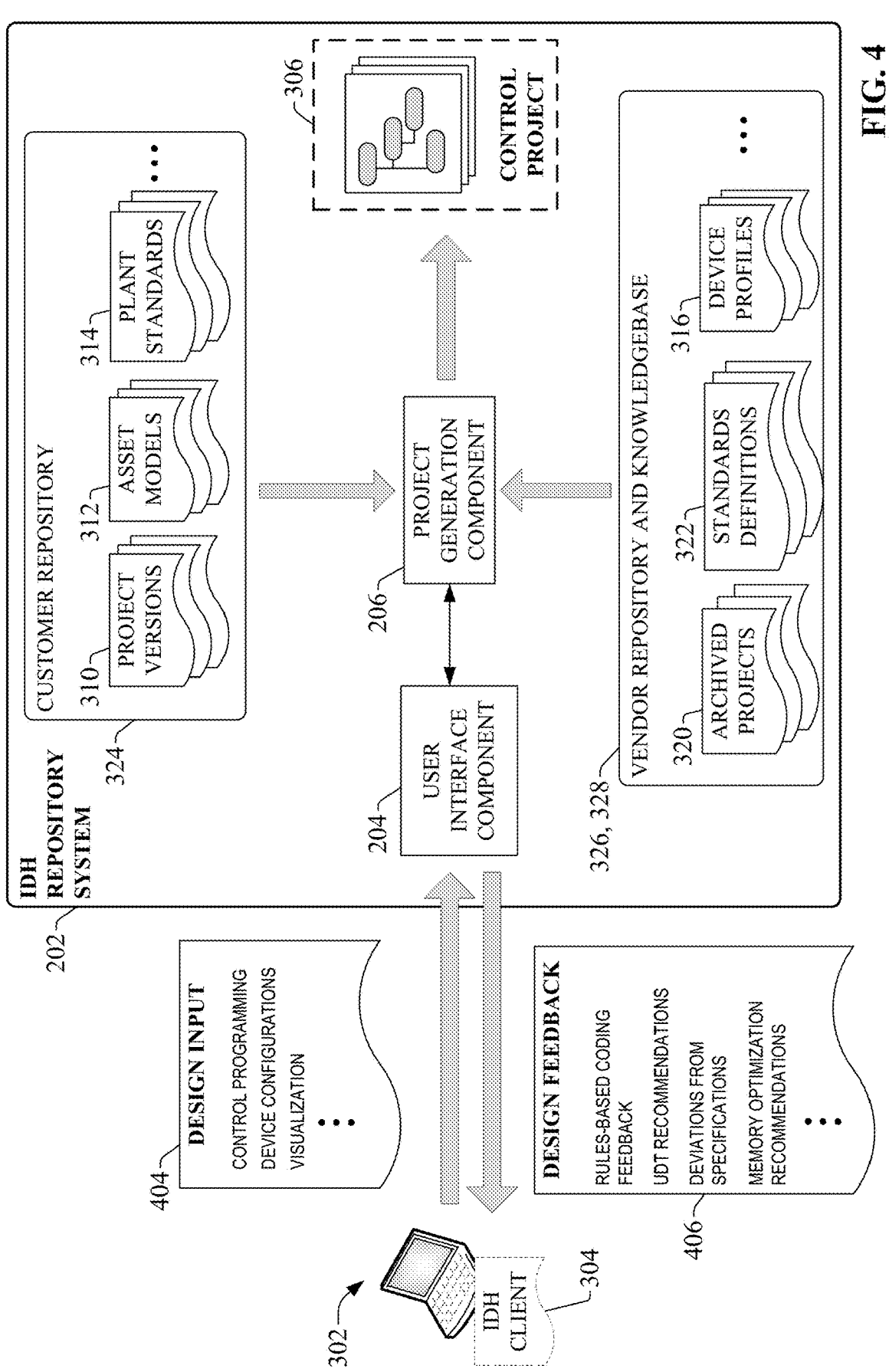
FIG. 4 is a diagram illustrating example data flows associated with creation of a new control project for an automation system being designed using the IDH repository system.

As noted above, control project 306 can be submitted as one or more completed project files for a given industrial control project to be stored and analyzed, or, if the repository system's native project development tools are being used to create a new project, may be submitted as design input during development of the project. FIG. 4 is a diagram illustrating example data flows associated with creation of a new control project 306 for an automation system being designed using repository system 202 according to one or more embodiments. In this example, client device 302 accesses the repository system's project development tools and leverages these tools to create a control project 306 for an automation system being developed. Control project 306 may comprise one or more of industrial controller code, (e.g., control logic, structured text, sequential function charts, etc.), device configuration files or parameter settings, HMI applications defining HMI screens or AR/VR visualizations for visualizing the automation system's operation, or other such aspects of a control project.

Accordingly, to facilitate project development, user interface component 204 can serve development interface displays to the client device 302 that allow a user to submit design input 404 to the repository system 202 in various supported formats, including but not limited to control programming for execution on an industrial controller, device configuration settings to be downloaded to respective industrial devices (e.g., motor drives, sensors, industrial controllers, etc.) to facilitate configuration of those devices, HMI screen development data, or other such design input 404. Based on this design input 404, project generation component 206 generates a control project 306 comprising one or more of compiled controller code, device configuration data, HMI application files, or other such executable control project data that can be deployed and executed on the appropriate industrial devices to carry out the programmed control functions.

In some embodiments, the repository system 202 can assist the developer in devising a hybrid project development approach, such that design functions are split between a local workstation and the cloud-based design services. In this regard, the repository system 202 can assist the designer to delineate which portions of project development are executed locally and which portions are executed on the cloud platform.

Also, during development of the control project 306, project generation component 206 can generate design feedback 406 intended to assist the developer in connection with developing and optimizing the control project 306, and this design feedback 406 can be rendered by the user interface component 204 as real-time feedback to the designer. This design feedback 406 can be generated based on the analysis of the design input 404 itself, as well as information stored in the customer repository 324, vendor repository 326, and knowledgebase 328.

For example, as the designer is entering, as design input 404, control code to be compiled and executed on an industrial controller, project generation component 206 can perform code analysis on the code and provide recommendations, notifications, or predictions based on the analysis relative to a variety of code or project quality metrics. This analysis can include determining whether the control code conforms to the engineering standards and practices used at the plant facility for which the code is being developed. To aid in this analysis, engineers at the plant facility can submit control code standards definitions defining the coding standards that all control code is expected to adhere to before being permitted to execute within the plant facility. These coding standards can be stored in the customer's repository 324 as plant standards 314, and can be referenced by the project generation component 206 as the designer submits design input 404 to determine whether the submitted control code is in conformance with plant standards.

Plant standards 314 can define coding standards both in terms of preferred control behaviors (e.g., preferred control sequences to be used or interlocks that must be recognized when carrying out a particular type of control action, preferred maximum or minimum control setpoints for particular machine operations, etc.) as well as in terms of preferred code formatting. Plant standards 314 may also define preferred parameters or configurations for particular types of devices (e.g., motor drives, network infrastructure devices, etc.), and project generation component 206 can monitor the submitted design input 404 during development to ensure that any device configurations submitted by the designer conform to the defined standards. Upon determining, based on this assessment, that the designer has entered a non-compliant device configuration, project generation component 206 can generate design feedback notifying the user of the deviation and indicating the allowable configuration parameters.

Plant standards 314 may also include project-specific standards, including functional specifications or safety validation requirements. Project generation component 206 can monitor the design input 404 with reference to the functional project requirements defined by the plant standards 314 and, upon determining that any portion of the submitted design input 404 deviates from the defined functional specifications or safety validation requirements, generate design feedback notifying the user of the deviation and offering recommendations as to how the deviant portion of the control project can be brought within compliance. Plant standards 314 can define functional specifications in terms of manufacturing functions to be carried out, preferred equipment vendors, equipment to be used, product output requirements, energy consumption requirements, network utilization requirements, or other such specifications. Depending on the functional specifications set forth by the plant standards 314, project generation component 206 can infer relevant properties of the control project 306 based on the design input 404 and notify the user if any aspect of the project deviates from these standards. For example, if the functional specification dictates that only motor drives from an indicated preferred vendor are to be used for the new installation, project generation component 206 may infer from the design input 404 (e.g., from the I/O configuration of an industrial controller, or from device configuration data included in the design input 404) that devices from a non-approved vendor are being included in the control project design, and notify the user that other devices from an approved vendor must be substituted.

In some embodiments, project generation component 206 can also compare control code submitted as part of the design input 404 with previously submitted control code included in archived project versions 310 for the same control project or different control projects developed by the same customer. Based on analysis of other control code submitted by the customer and archived in the customer repository 324, project generation component 206 can learn or infer typical coding styles or design approaches used by that customer. This can include, for example, code indentation preferences, preferences regarding the use of call statements, rung commenting standards, variable or I/O naming standards, or other such preferred programming characteristics. In addition to control coding standards, the project generation component 206 can also identify the customer's preferred manner of programming certain control operations. For example, project generation component 206 may identify, based on analysis of archived project versions 310, that the customer uses a particular control sequence in order to move material from a source container to a tank, or that the customer typically associates a particular control operation with a set of interlocks that must be satisfied before the control operation can be performed.

Based on these learned customer programming preferences, the project generation component 206 can identify whether the control programming being submitted as part of design input 404 deviates from either the plant's preferred coding practices or the plant's preferred manner of controlling certain industrial operations based on comparison with the project versions 310, and generate design feedback 406 notifying of these deviations and recommending alternative control coding that will bring the current project into conformity with previous design strategies. This feedback 406 may include, for example, a recommendation to add one or more interlocks to the control programming for a particular control operation, a recommendation to re-order a sequence of operations for control of a particular type of machine, a recommendation to rename a variable or an I/O point to conform with the plant's preferred nomenclature, a recommendation to add or revise a rung comment, a recommendation to change an indentation for a portion of control code, a recommendation to replace repeated instances of code with a CALL statement, or other such feedback.

Project generation component 206 can also reference vendor-specific equipment or device data in one or more vendor repositories 326 to predict whether the user's submitted design input 404 will cause equipment integration or compatibility issues. This determination can be based, for example, on device profiles 316 submitted by the equipment vendor for access by the project generation component 206. Each device profiles 316 may comprise digital specification data for a given device, and may also record known compatibility issues for the device. Using this information, project generation component 206 can assess the submitted design input 404 to determine whether any portion of the submitted control programming or device configurations will result in a performance or integration issue given known limitations of one or more devices. This assessment may also consider inferred interactions between sets of devices that the user is designing for collaborative operation. For example, if the design input 404 suggests that the designer is intending to configure two non-compatible devices for collaborative operation (as determined based on known compatibility issues recorded in the device profiles 316), project generation component 206 can generate design feedback 406 indicating the two non-compatible devices.

Figure 5:
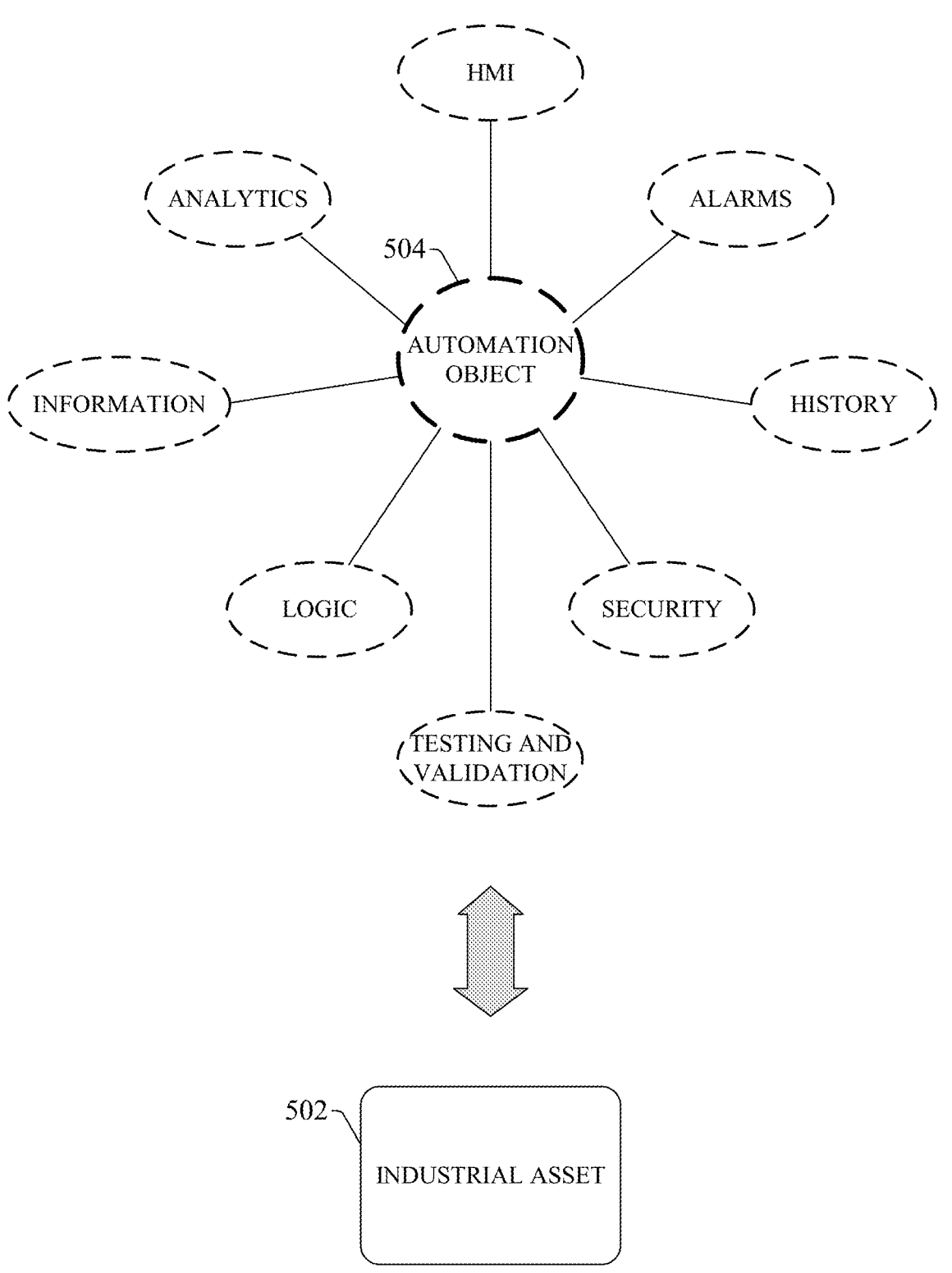
FIG. 5 is a diagram illustrating several example automation object properties that can be leveraged by the IDH repository system in connection with building, deploying, and executing a control project.

To support enhanced development capabilities, some embodiments of IDH repository system 202 can support control programming based on an object-based data model rather than a tag-based architecture. Automation objects can serve as the building block for this object-based development architecture. FIG. 5 is a diagram illustrating several example automation object properties that can be leveraged by the repository system 202 in connection with building, deploying, and executing a control project 306. Automation objects 504 can be created and augmented during design, integrated into larger data models, and consumed during runtime. These automation objects 504 provide a common data structure across the repository system 202 and can be stored in an object library (e.g., part of memory 228) for reuse. The object library can store predefined automation objects 504 representing various classifications of real-world industrial assets 502, including but not limited to pumps, tanks, values, motors, motor drives (e.g., variable frequency drives), industrial robots, actuators (e.g., pneumatic or hydraulic actuators), or other such assets. Automation objects 504 can represent elements at substantially any level of an industrial enterprise, including individual devices, machines made up of many industrial devices and components (some of which may be associated with their own automation objects 504), and entire production lines or process control systems.

An automation object 504 for a given type of industrial asset can encode such aspects as 2D or 3D visualizations, alarms, control coding (e.g., logic or other type of control programming), analytics, startup procedures, testing protocols and scripts, validation procedures and reports, simulations, schematics, security protocols, and other such properties associated with the industrial asset 502 represented by the object 504. Some automation objects 504 can also be geotagged with location information identifying the location of the associated asset. During runtime of the control project 306, the automation object 504 corresponding to a given real-world asset 502 can also record status or operational history data for the asset. In general, automation objects 504 serve as programmatic representations of their corresponding industrial assets 502, and can be incorporated into a control project 306 as elements of control code, a 2D or 3D visualization, a knowledgebase or maintenance guidance system for the industrial assets, or other such aspects.

Some embodiments of project analysis component 210 can also predict network traffic or load statistics based on the device configuration information obtained from analysis of the control project 306 and generate network configuration recommendations based on these predictions. This analysis can be based on a comparison of the customer's network configuration with known or recommended network configurations. Project analysis component 210 may also generate a network risk report indicating risks of network failure as a result of implementing the proposed control design.

Figure 6:
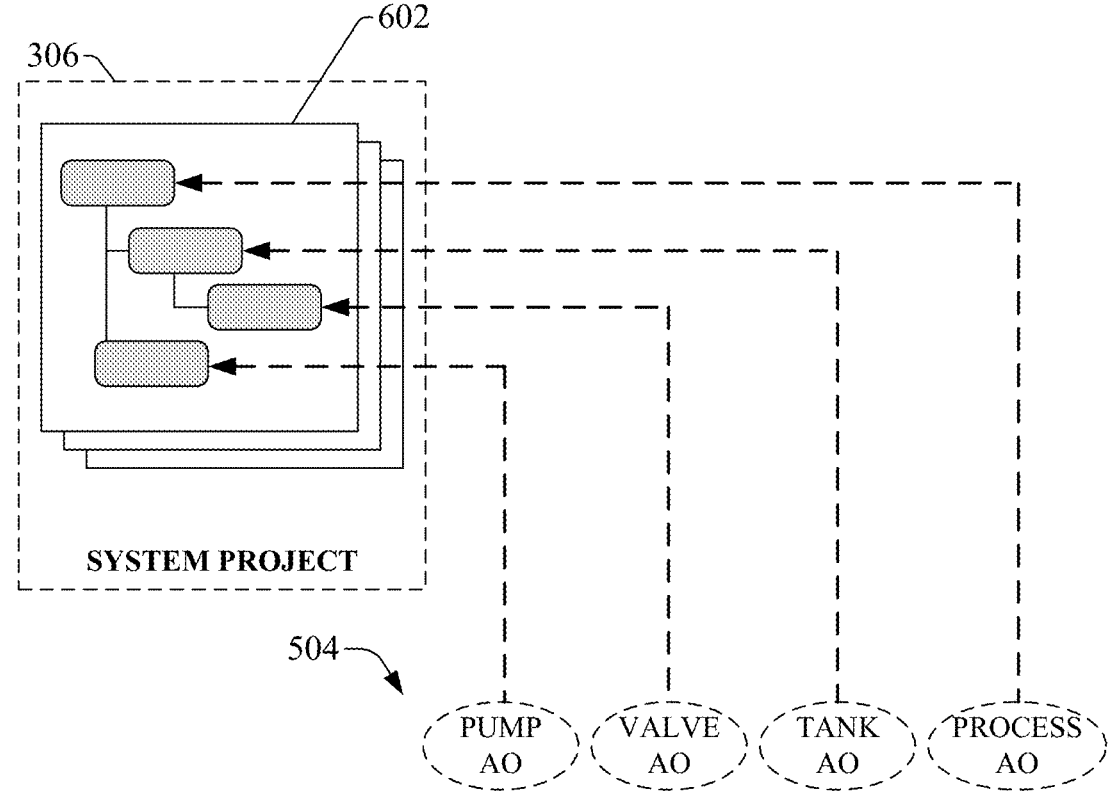
FIG. 6 is a diagram illustrating an example system project that incorporates automation objects into the project model.

FIG. 6 is a diagram illustrating an example system project 306 that incorporates automation objects 504 into the project model. In this example, various automation objects 504 representing analogous industrial devices, systems, or assets of an automation system (e.g., a process, tanks, valves, pumps, etc.) have been incorporated into system project 306 as elements of a larger project data model 602. The project data model 602 also defines hierarchical relationships between these automation objects 504. According to an example relationship, a process automation object representing a batch process may be defined as a parent object to a number of child objects representing devices and equipment that carry out the process, such as tanks, pumps, and valves. Each automation object 222 has associated therewith object properties or attributes specific to its corresponding industrial asset (e.g., those discussed above in connection with FIG. 5), including executable control programming for controlling the asset (or for coordinating the actions of the asset with other industrial assets) and visualizations that can be used to render relevant information about the asset during runtime.

At least some of the attributes of each automation object 504 are default properties defined by the repository system 202 based on encoded industry expertise pertaining to the asset represented by the objects. These default properties can include, for example, industry-standard or recommended control code for monitoring and controlling the asset represented by the automation object 504, a 2D or 3D graphical object that can be used to visualize operational or statistical data for the asset, alarm conditions associated with the asset, analytic or reporting scripts designed to yield actionable insights into the asset's behavior, or other such properties. Other properties can be modified or added by the developer as needed (via design input 512) to customize the automation object 504 for the particular asset and/or industrial application for which the system projects 302 is being developed. This can include, for example, associating customized control code, HMI screens, AR presentations, or help files associated with selected automation objects 222. In this way, automation objects 504 can be created and augmented as needed during design for consumption or execution by target control devices during runtime.

Figure 7:
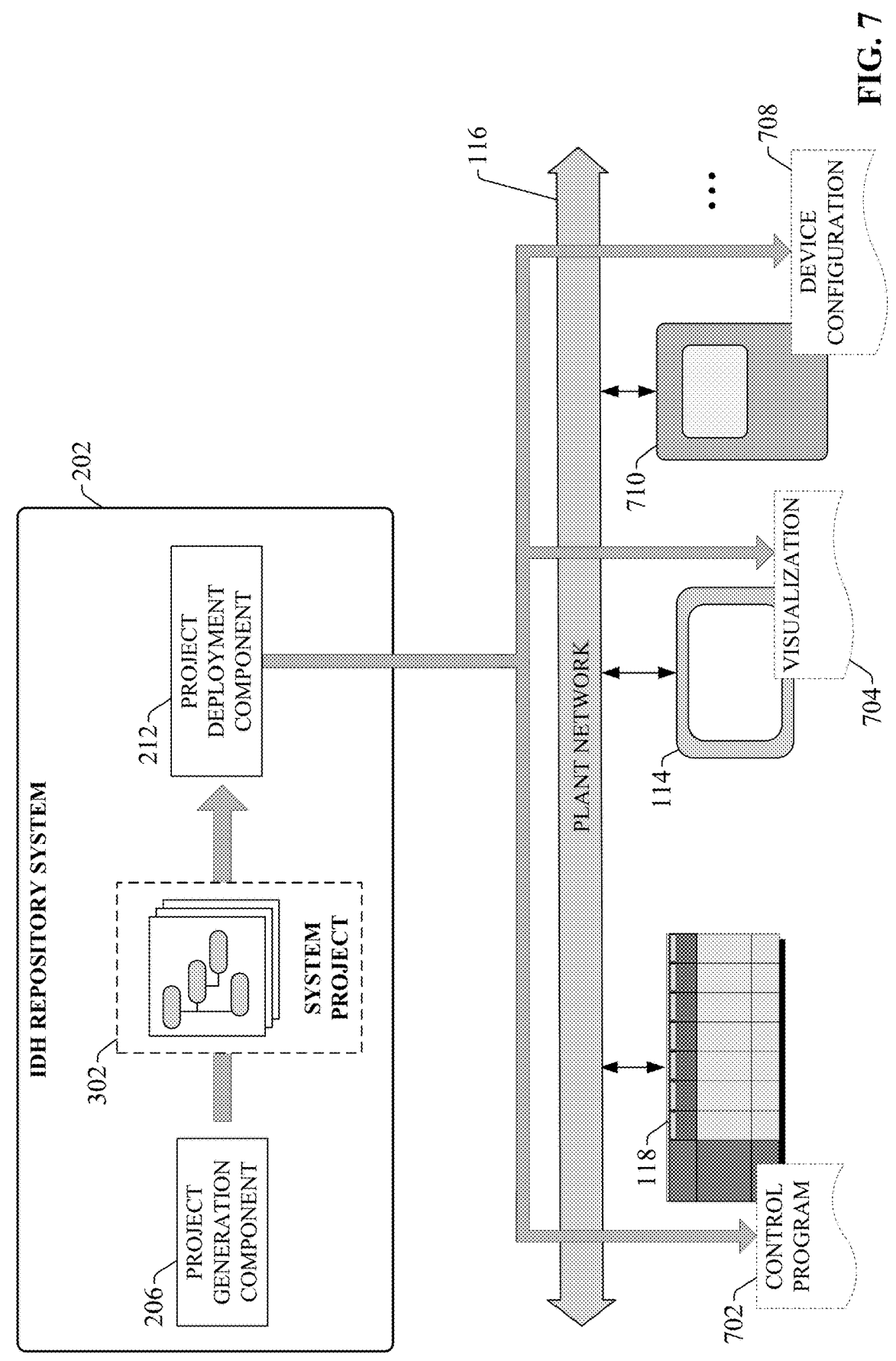
FIG. 7 is a diagram illustrating commissioning of a system project.

Once development and testing on a system project 306 has been completed, commissioning tools supported by the repository system 202 can simplify the process of commissioning the project in the field. When the system project 306 for a given automation system has been completed, the system project 306 can be deployed to one or more target control devices for execution. FIG. 7 is a diagram illustrating commissioning of a system project 306. Project deployment component 212 can compile or otherwise translate a completed system project 306 into one or more executable files or configuration files that can be stored and executed on respective target industrial devices of the automation system (e.g., industrial controllers 118, HMI terminals 114 or other types of visualization systems, motor drives 710, telemetry devices, vision systems, safety relays, etc.).

Conventional control program development platforms require the developer to specify the type of industrial controller 118 (e.g., the controller's model number) on which the control program will run prior to development, thereby binding the control programming to a specified controller. Controller-specific guardrails are then enforced during program development which limit how the program is developed given the capabilities of the selected controller. By contrast, some embodiments of the IDH repository system 202 can abstract project development from the specific controller type, allowing the designer to develop the system project 306 as a logical representation of the automation system in a manner that is agnostic to where and how the various control aspects of system project 306 will run. Once project development is complete and system project 306 is ready for commissioning, the user can specify (via user interface component 204) target devices on which respective aspects of the system project 306 are to be executed. In response, an allocation engine of the project deployment component 212 will translate aspects of the system project 306 to respective executable files formatted for storage and execution on their respective target devices.

For example, system project 306 may include—among other project aspects—control code, visualization screen definitions, and motor drive parameter definitions. Upon completion of project development, a user can identify which target devices—including an industrial controller 118, an HMI terminal 114, and a motor drive 710—are to execute or receive these respective aspects of the system project 306. Project deployment component 212 can then translate the controller code defined by the system project 306 to a control program file 702 formatted for execution on the specified industrial controller 118 and send this control program file 702 to the controller 118 (e.g., via plant network 116). Similarly, project deployment component 212 can translate the visualization definitions and motor drive parameter definitions to a visualization application 704 and a device configuration file 708, respectively, and deploy these files to their respective target devices for execution and/or device configuration.

In general, project deployment component 212 performs any conversions necessary to allow aspects of system project 306 to execute on the specified devices. Any inherent relationships, handshakes, or data sharing defined in the system project 306 are maintained regardless of how the various elements of the system project 306 are distributed. In this way, embodiments of the IDH repository system 202 can decouple the project from how and where the project is to be run. This also allows the same system project 306 to be commissioned at different plant facilities having different sets of control equipment. That is, some embodiments of the IDH repository system 202 can allocate project code to different target devices as a function of the particular devices found on-site. IDH repository system 202 can also allow some portions of the project file to be commissioned as an emulator or on a cloud-based controller.

As an alternative to having the user specify the target control devices to which the system project 306 is to be deployed, some embodiments of IDH repository system 202 can actively connect to the plant network 116 and discover available devices, ascertain the control hardware architecture present on the plant floor, infer appropriate target devices for respective executable aspects of system project 306, and deploy the system project 306 to these selected target devices. As part of this commissioning process, IDH repository system 202 can also connect to remote knowledgebases (e.g., web-based or cloud-based knowledgebases) to determine which discovered devices are out of date or require firmware upgrade to properly execute the system project 306. In this way, the IDH repository system 202 can serve as a link between device vendors and a customer's plant ecosystem via a trusted connection in the cloud.

Copies of system project 306 can be propagated to multiple plant facilities having varying equipment configurations using smart propagation, whereby the project deployment component 212 intelligently associates project components with the correct industrial asset or control device even if the equipment on-site does not perfectly match the defined target (e.g., if different pump types are found at different sites). For target devices that do not perfectly match the expected asset, project deployment component 212 can calculate the estimated impact of running the system project 306 on non-optimal target equipment and generate warnings or recommendations for mitigating expected deviations from optimal project execution.

Completed control projects 306—either developed using the repository system's project editing tools (as described above in connection with FIG. 4) or using separate control project development platforms (e.g., ladder logic development platforms, HMI application development platforms, device configuration applications, etc.)—can be submitted to the repository system 202 for analysis, archival, or upgrade purposes, as depicted in FIG. 3. In this regard, the IDH repository system 202 serves as a secure and intelligent industrial control project repository open to any number of participating industrial customers, which offers both secure archival of control projects 306 as well as analysis of these projects 306 for the purposes of generating project recommendations 308 intended to optimize the control design, or to guide the designer to previously unknown and unused device features that, if utilized, may improve performance of the control project. As will be described in more detail below, the repository system 202 can also generate a variety of relational dependency maps based on analysis of submitted control project 306. These dependency maps can document data or hardware dependencies in terms of data producers and data consumers within the automation system being monitored and controlled by the control project 306.

Figure 8:
FIG. 8 is a diagram illustrating extraction of project telemetry data from a control project submitted to the repository system.

To facilitate intelligent analysis of a submitted control project 306, IDH repository system 202 can include a project telemetry component 208 that generates project telemetry data for a submitted control project 306, which can offer insights into both the control project itself as well as the equipment and device topology of the automation system for which the control project 306 is being designed. FIG. 8 is a diagram illustrating extraction of project telemetry data 802 from a control project 306 submitted to the repository system 202. Based on analysis of the control project 306, project telemetry component 208 can determine or infer characteristics of the control project 306 itself, information regarding the devices or equipment that makes up automation system to be monitored and controlled by the control project 306, predictions regarding performance or resource utilization of the controlled system, the control design's estimated impacts on device lifecycle for one or more devices, or other such project metrics.

For example, based on analysis of an industrial controller program file—which may include control code, I/O configuration data, and networking configuration data for an industrial controller—the project telemetry component 208 may identify input or output devices connected to the industrial controller (e.g., based on examination of the I/O configuration or the control code itself), and record an inventory of these devices in the project telemetry data 802. Similar analysis can be used to determine I/O or control modules configured for use, as well as information regarding how the controller's I/O is being utilized. Project telemetry component 208 can also record inferred functional or topological relationships between any two or more of the devices or equipment identified as being part of the automation system. Project telemetry component 208 can also estimate a total amount of network bandwidth or energy that the automation system is expected to consume. To yield further insights into how the devices that make up the control system are being used, project telemetry data 802 can also record which subset of the available features of a device are currently being used by the control project 306.

In addition to metrics for the automation system to be controlled, the project telemetry component 208 can also estimate performance metrics for the control code itself, such as an estimated amount of memory or processing power required to execute aspects of the control project 306.

In some cases, project telemetry component 208 can enhance the project telemetry data 802 generated for the control project 306 by referencing vendor-specific device information stored in device profiles 316 on the vendor repository 326. For example, the project telemetry component 208 may identify, based on analysis of the control project 306, that a particular device model (e.g., an I/O module, a network infrastructure device, a motor drive, a servo, an actuator, etc.) is being used as a component of the automation system. Based on identification of this device, project telemetry component 208 can access the vendor repository 326 corresponding to the vendor of the device, determine whether a device profile is available for the device, and, if so, retrieve functional specification data for the device from the device profile 316 for inclusion in the project telemetry data 802. This functional specification data, which depends on the type of device, can include such information as the device's available I/O, available configuration parameters or functionalities, available memory or processing capacity, lifecycle information, response times, physical dimensions, rated power, networking capabilities, operational limitations (e.g., environmental requirements, such as ambient temperatures for which the device is rated), or other such supplemental device information.

Figure 9:
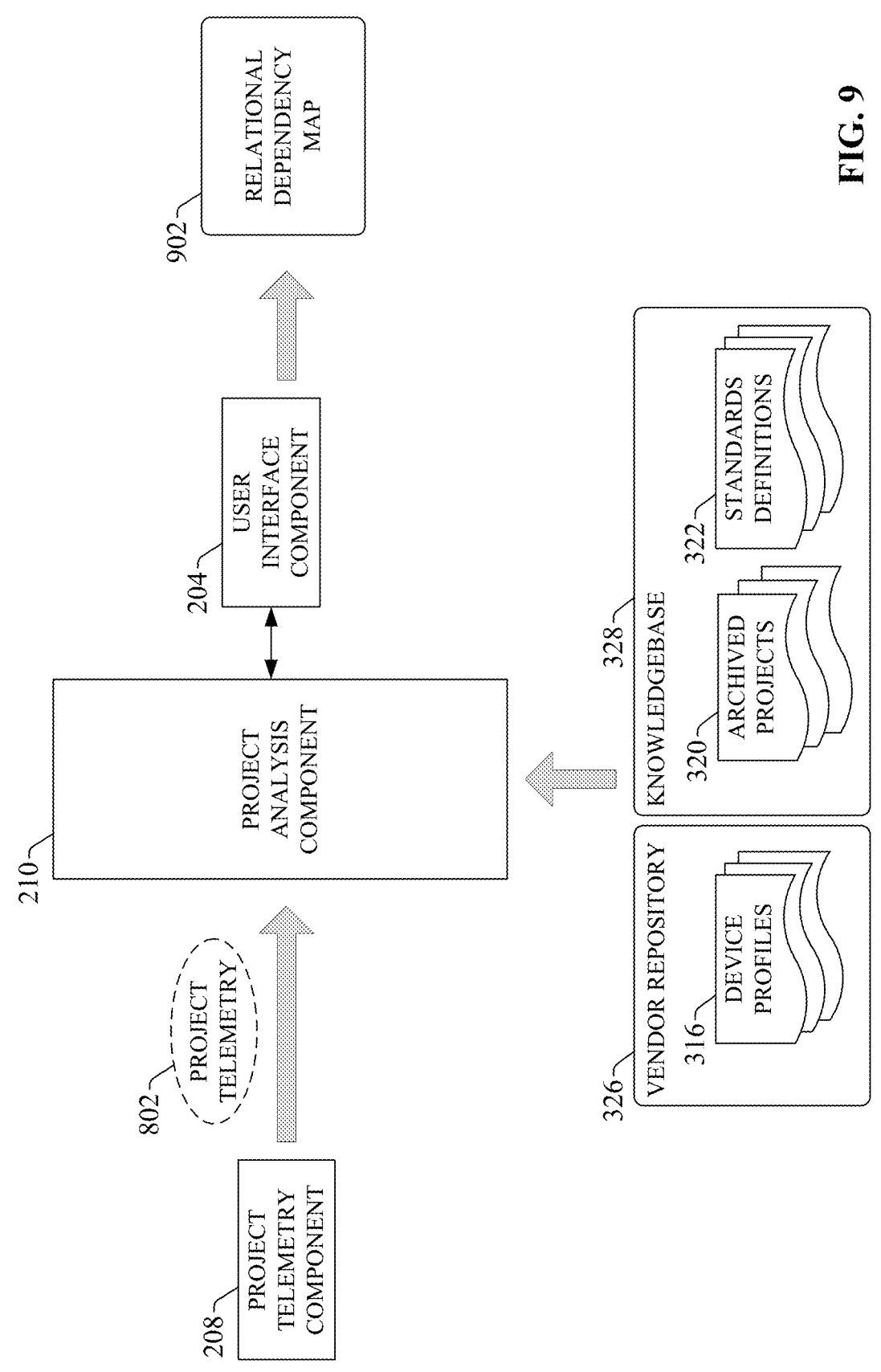
FIG. 9 is a diagram illustrating creation of a relational dependency map by the repository system.

Once project telemetry data 802 has been extracted for a submitted control project 306, the repository system's project analysis component 210 can leverage this telemetry data 802 for the purposes of analysis and documentation. For example, the project analysis component 210 can generate relational dependency maps for the control project 306 based on analysis of the project telemetry data 802. FIG. 9 is a diagram illustrating creation of a relational dependency map 902 by the repository system 202 according to one or more embodiments. After a user has submitted a control project 306 to the repository system 202 and the project telemetry component 208 has extracted project telemetry data 802 for the project 306, the project analysis component 210 analyzes this telemetry data 802 to learn dependencies between data tags or data items of the various devices and systems that make up the automation system to be monitored and controlled by the project 306, and generates a relational dependency map 902 that visualizes these dependencies as a graphical map. The user interface component 204 can render this relational dependency map 902 on client devices associated with personnel authorized to access and view this project information.

The project analysis component 210 can leverage any relevant information included in the project telemetry data 802 in connection with discovering data dependencies between devices of the automation system that produce data and devices that consume the data. For example, project analysis component 210 may determine dependencies between produced data and consumed data based on such telemetry data 802 as network configuration information (which may indicate devices that share a common network), device inventory information identifying the various data producing and data consuming devices of the automation system, I/O module configurations for an industrial controller 118 (which can identify devices that are communicatively interfaced with an industrial controller's hardwired or networked I/O and associated data tags), or other such information. The project analysis component 210 may also determine or infer functional or topological relationships between two or more devices of the automation system based on analysis of the telemetry data 802.

The user interface component 204 can render the relational dependency maps 902 in a navigable format that allows a user to browse through different views of the control project elements. FIG. 10 is an example display screen 1002 that can be rendered by the user interface component 204, and that lists the industrial controllers 118 that make up an automation system represented by a control project 306. This display screen 1002 represents a Controller view of a submitted project 306, in which the user interface component 204 filters the available telemetry data 802 to display only information about the industrial controllers 118 that make up the control system. The controllers are rendered as a list of entries 1004, where each entry 1004 contains information about one of the controllers 118, including a name and type of the controller 118, a currently installed firmware version, a date of the most recent firmware or software update on the controller 118, and contact information of an employee responsible for maintaining the controller 118.

Figure 11:
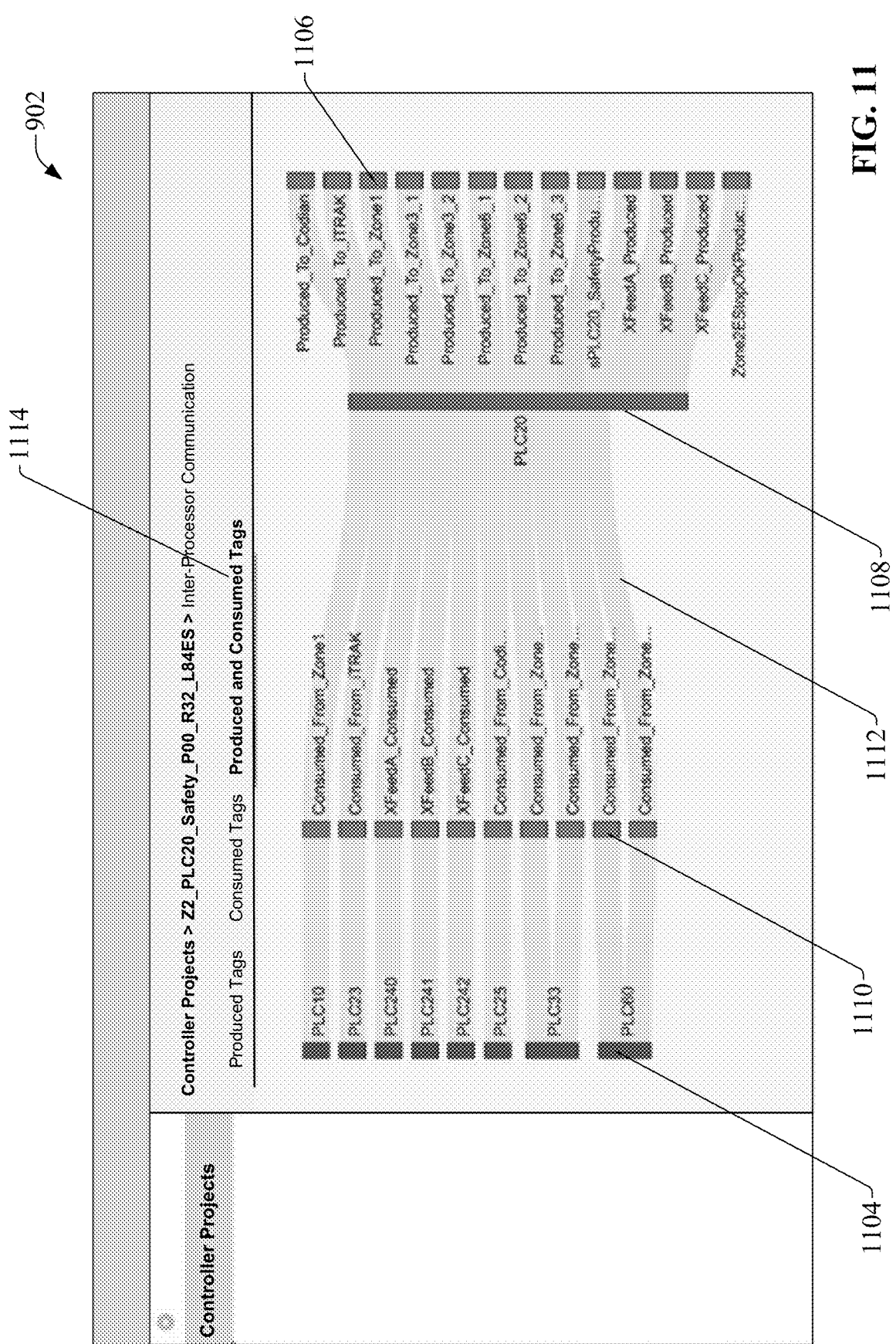
FIG. 11 is an example relational dependency map that can be generated by the IDH repository system in response to selection of a controller.

To view the relational dependency map 1002 for a controller 118, the user can select an entry 1004 corresponding to the controller 118 of interest, which causes the relational dependency map 1002 for the selected controller 118 to be displayed. FIG. 11 is an example relational dependency map 902 that can be generated by the user interface component 204 in response to selection of a controller. In general, the relational dependency map 902 displays icons representing devices and systems of the automation system to be monitored and controlled by the control project 306—e.g., industrial controllers 118, safety relays, HMIs, etc.—and their associated data tags. The relational dependency map 902 for a selected controller 118 or other device graphically depicts data producers and data consumers from the standpoint of the selected controller 118. In the illustrated example, a controller named PLC20 has been selected. A device icon 1108 representing this selected controller is rendered on the right side of the map 902. Data tag icons 1106 representing data tags defined on the controller PLC20 are rendered to the right of the device icon 1108. These data tag icons 1106 are labeled with the names of the tags, and also include labels indicating whether the corresponding data tags are produced by the controller 118 (that is, the value of the data tag is set by the controller and read by another device) or consumed by the controller 118 (that is, the value of the data tag is set by another device and read by the controller 118 from that device).

Device icons 1104 representing other controllers (PLC10, PLC23, etc.) having a data produce or data consume relationship with the selected controller (PLC20) are rendered on the left side of the map 902. To the right of these device icons 1104 are rendered data tag icons 1110 representing data tags of those controllers that either produce data that is consumed by the selected controller (PLC20) or consume data generated by the selected controller. These various icons are connected with graphical connection lines 1112 representing the data produce and data consume relationships between the data tags and their corresponding controllers. For example, for a data tag that is produced by PLC20 and consumed by PLC240, the map 902 can render a line 1112 from the left-side icon 1106 representing the data tag to the device icon 1108 for its corresponding controller (PLC20), and another line 1112 can connect the PLC20 device icon 1108 to the data tag icon 1110 corresponding to the consuming data tag of PLC240. Another line 1112 connects the data tag icon 1110 to its corresponding device icon 1104. This yields a network map representing a data tag view of the control project 306 from the standpoint of a selected controller (represented by device icon 1108).

The icons can be color coded to indicate the type of element represented by the icon (e.g., a first color for the device icons 1104, 1108, and a second color for the data tag icons 1110, 1106). Users can select whether the map 902 depicts both produced and consumed tags (as in the view depicted in FIG. 11), whether the map 902 depicts only produced tags, or whether the map 902 depicts only consumed tags using selectable tabs 1114 above the map 902.

Although the example map 902 illustrated in FIG. 11 depicts only industrial controllers and their data tags, relational dependency maps 902 can also depict produce consume relationships between other types of devices, including but not limited to HMIs, safety relays, variable frequency drives, industrial robots, quality check systems, or other such devices.

The user interface component 204 can allow users to navigate the map 902 by clicking on icons within the map. For example, selecting on a device icon 1104 on the left side of the map 902 can cause the user interface component 204 to render a new relational dependency map 902 from the standpoint of the controller corresponding to the selected icon 1104 (that is, the new map 902 will depict only dependencies relating to data tags of the selected controller, while omitting other data dependencies that do not involve the selected controller). In another example, selecting a data tag icon 1110 can cause the user interface component to render another map 902 that graphically depicts the device that produces the data tag corresponding to the selected icon 1110, as well as the devices or systems that consume or reference the selected data tag, while omitting other data dependencies that do not involve the selected data tag.

Substantially any types of project information can be uploaded to and analyzed by the repository system 202 to generate the dependency map 902, including but not limited to control projects 306, industrial controller program files, or other such project information. Moreover, although the present example assumes that the project telemetry data 802 used to generate the map 902 was derived from a single control project 306, the project analysis component 210 can integrate project telemetry data 802 from multiple related control projects 306 submitted to the system 202 by an industrial customer to generate the relational dependency maps 902. This aggregation of telemetry data from multiple control projects 306 may be appropriate if multiple automation systems that are monitored and controlled by separate control projects 306 exchange data with one another during operation. In such scenarios, the project analysis component 210 can identify the data dependencies based on analysis of the different sets of project telemetry data 802 generated for the respective different control projects 306, and generate a unified dependency map 902 illustrating these dependencies.

Also, in some embodiments the repository system 202 can generate relational dependency maps 902 to depict both as-designed data dependencies as well as runtime data dependencies depicting the actual data relationships of the as-installed control system. For example, while a control project 306 submitted by a user may represent the as-designed control system as it is intended to be installed, in some scenarios there the installation of the physical control system within a plant facility may deviate from the original control design as represented by the originally submitted control project 306. Such scenarios may be common, for example, if a corporate design team has designed a baseline control system to be installed at multiple industrial facilities. In some cases, the physical installations of the control system at some industrial facilities may deviate from the original design due to differences in the equipment used at those devices or individual customizations of the control designs implemented by local plant engineers. The repository system 202 can allow users to selectively view both the as-designed data relationships as well as the as-installed relationships as respective relational dependency maps 902.

Figure 12:
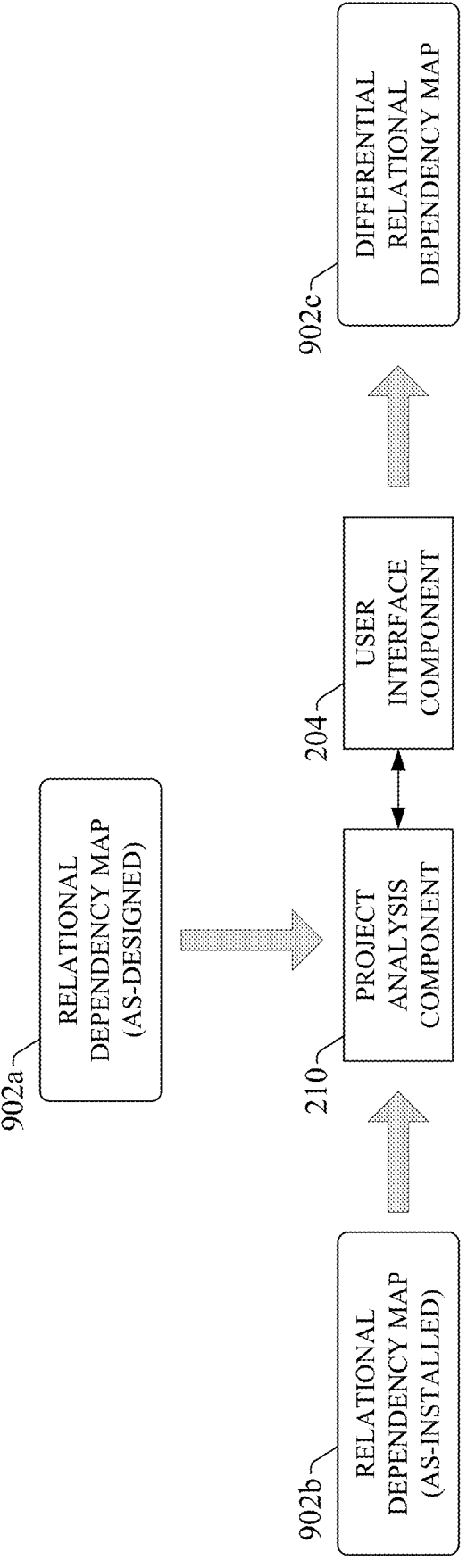
FIG. 12 is a diagram illustrating generation of a differential dependency map by the IDH repository system.

The system 202 can also perform differencing analysis of the as-designed and as-installed (or runtime) data dependencies and depict the differences between the two as a differential map 902. FIG. 12 is a diagram illustrating generation of a differential dependency map 902*c* by the repository system 202. In this example, map 902*a* represents the as-designed relational dependency map as derived from one or more control projects 306 submitted by an industrial customer. Map 902*b* represents a relational map for an installed instance of the control project 306, which may deviate from the original as-designed control system. The as-installed map 902*b* may be derived from a version of the control project 306 that has been updated—e.g., via live runtime data received from the installed control system or via manual update by a plant engineer—to reflect the control system as it was installed. The project analysis component 210 can compare the as-designed map 902*a* with the as-installed map 902*b* and, based on this comparison, generate a differential map 902*c* that graphically indicates differences between the two maps. The differential map 902*c* can have a similar format to that of the as-designed map 902*a*, but can include graphical or alphanumeric indicators that convey any deviations between the two maps 902*a* and 902*b* in terms of data dependencies that have been changed. For example, the differential map 902*c* can use color-coded indicators to identify as-built data dependencies that have changed from the as-designed relationships, and may also indicate previous as-designed dependencies that are no longer valid in the as-built design using a different graphical format from that used for the valid dependencies.

Figure 13:
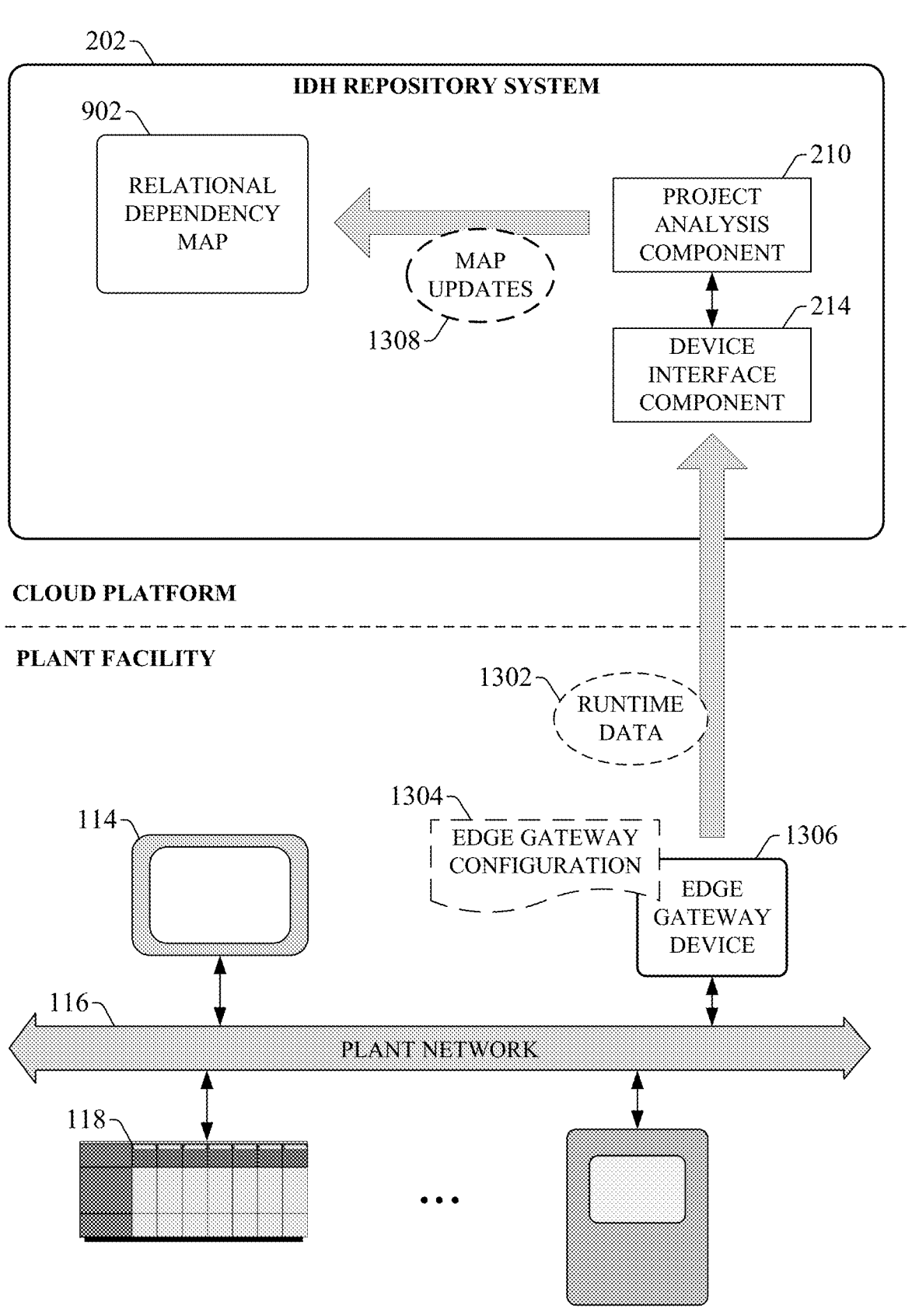
FIG. 13 is a diagram depicting collection of runtime data from an installed control system by the IDH repository system.

Once a control system corresponding to a control project 306 has been installed at a plant facility, the repository system 202 can interface with the control system to retrieve real-time operational or configuration data from the control system and render a runtime view of the relational map 902. FIG. 13 is a diagram depicting collection of runtime data 1302 from an installed control system by the IDH repository system 202. In this example, the repository system's device interface component 214 remotely interfaces with devices of the installed control system via an edge gateway device 1306, which itself is installed at the plant facility and networked to one or more of the devices that make up the control system (e.g., industrial controllers 118, motor drives, HMIs, etc.). The edge gateway device 1306 can act as a data aggregator and bridge that collects runtime operational and status data from the control devices of the running automation system (e.g., from the data tags or registers of industrial controllers 118, telemetry devices, sensors, or other data sources associated with the automation system) and sends this runtime data 1302 to the repository system 202 for display or analysis. Although FIG. 13 depicts the edge gateway device 1306 as residing locally at the industrial facility, in some configurations the edge gateway may reside on an edge layer of the cloud platform. The device interface component 214 may also obtain the runtime data 1302 via other means without the use of an edge gateway device 1306. In some embodiments, the device interface component 214 can use discovery agents to discover and retrieve relevant data values from the industrial devices that make up the automation system.

Runtime data 1302 can comprise real-time operational or status information read from the data tags of industrial controllers 118, sensors, telemetry devices, or other devices of the automation system. The runtime data 1302 can also include device configuration data read from those devices, which may be used by the project analysis component 210 to determine data dependencies between data tags. An authorized user can invoke, on his or her client device, a runtime version of the relational dependency map 902 corresponding to the control system. This runtime version of the map 902 can overlay live values of the data tags depicted on the map 902, which are obtained from the runtime data 1302. In this way, the system can populate the relational dependency maps 902 with live data and allow users to remotely view these runtime maps 902.

In addition, the device interface component 214 can discover—e.g., using discovery agents deployed on the plant network 116 via the edge gateway device 1306—new device installations or other modifications to the automation system that are not currently reflected in the relational dependency map 902. Based on these discovered modifications, the project analysis component 210 can generate and apply map updates 1308 that update the relational dependency map 902 to reflect the discovered changes to the physical control system. In this way, newly installed assets and their data relationships to the existing assets of the control system can be automatically added to the map 902 by the system 202. In some embodiments, the system can allow a user to save this updated as-installed map 902 as a new as-designed map 902, which can be used as a starting point for further development. This new as-designed map 902 can then be modified or enhanced with future design plans.

Although the preceding examples have depicted relational maps 902 for data dependencies, some embodiments of repository system 202 can also generate relational dependency maps for other types of elements based on analysis of uploaded control projects 306. For example, some embodiments of repository system 202 can generate relational maps that graphically depict communication links between industrial controllers and HMI terminals, or other types of device-to-device communication. Other types of relational maps generated by the system 202 can graphically depict access gearing relationships, relationships between various data types (e.g., user-defined data types, string data types, etc.), controller add-on instructions (AOIs) defined in the control project 306, motion axes of motion devices that are controlled by the control project 306, automation objects or smart objects defined in the control project 306, or other dependencies between hardware or software entities of the automation system. As in the case of data tag relationship maps 902, the user interface component 204 can populate these dependency maps with runtime data 1302 obtained from the controlled automation system during operation, such that elements of the map are enhanced with current real-time data reflecting the current states of the elements.

This runtime data can be rendered as alphanumeric values on or near their corresponding elements, or as animated properties of the elements that reflect the current states.

Figure 14:
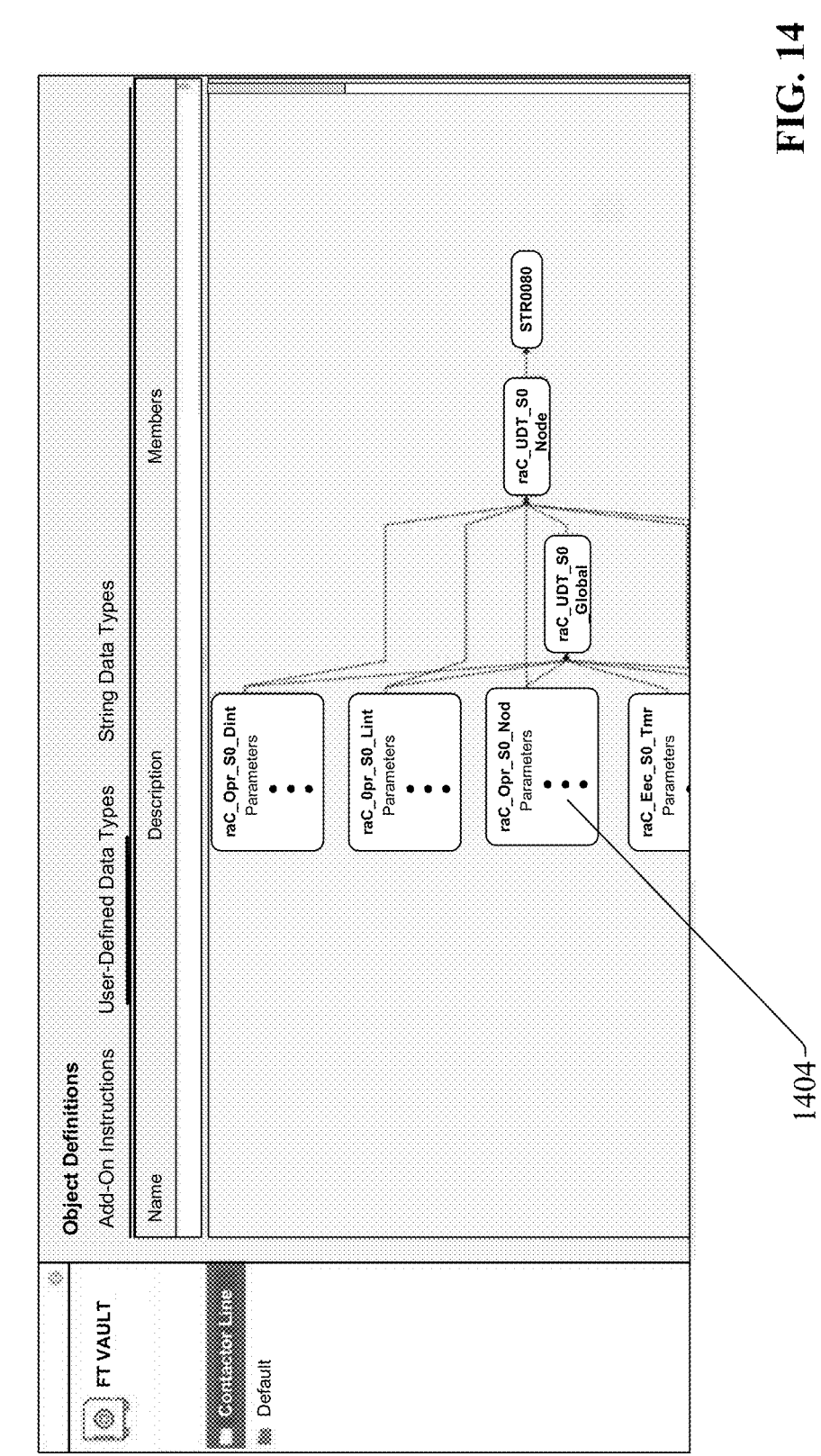
FIG. 14 is an example UDT relational map that can be rendered by the IDH repository system.

FIG. 14 is an example user-defined data type (UDT) relational map 1402 that can be rendered by the repository system 202 in one or more embodiments. In this example, data tags corresponding to user-defined data types (UDTs) defined in one or more submitted control projects 306 are represented as blocks 1404 labeled with the names of their corresponding data tags, as well as other information about the tags, including values of any parameters associated with the UDTs. Lines connecting the UDT blocks 1404 represent relational or dependency relationships between the UDTs.

Some embodiments of the repository system 202 can also generate dependency maps representing I/O module dependencies. These maps can depict how the respective I/O points of a controller's digital or analog I/O module are being consumed by one or more other controllers or devices. That is, these maps can depict dependencies at the module level rather than at the data tag level. In an example format, these maps can depict the I/O points of a selected I/O module as icons, and graphically connect each I/O icon to one or more other icons representing controllers or devices that either read the value of the corresponding I/O point (in the case of a digital or analog output point of the I/O module) or that generate a data value read by the corresponding I/O point (in the case of a digital or analog input point of the I/O module).

Returning to FIG. 13, some embodiments of the repository system 202 can also track how automation objects 504, smart objects, data tags, or controller files connect to edge gateway devices 1306 or edge gateway instances (in the case of edge gateways executing as instances on an edge level of the cloud platform), and visualize these connections via a relational map. At least some of some of the information used to generate these maps can be obtained from configuration files 1304 used to configure the edge gateway devices 1306, which can be uploaded to, or retrieved by, the repository system 202 via device interface component 214 for analysis and visualization.

Figure 15:
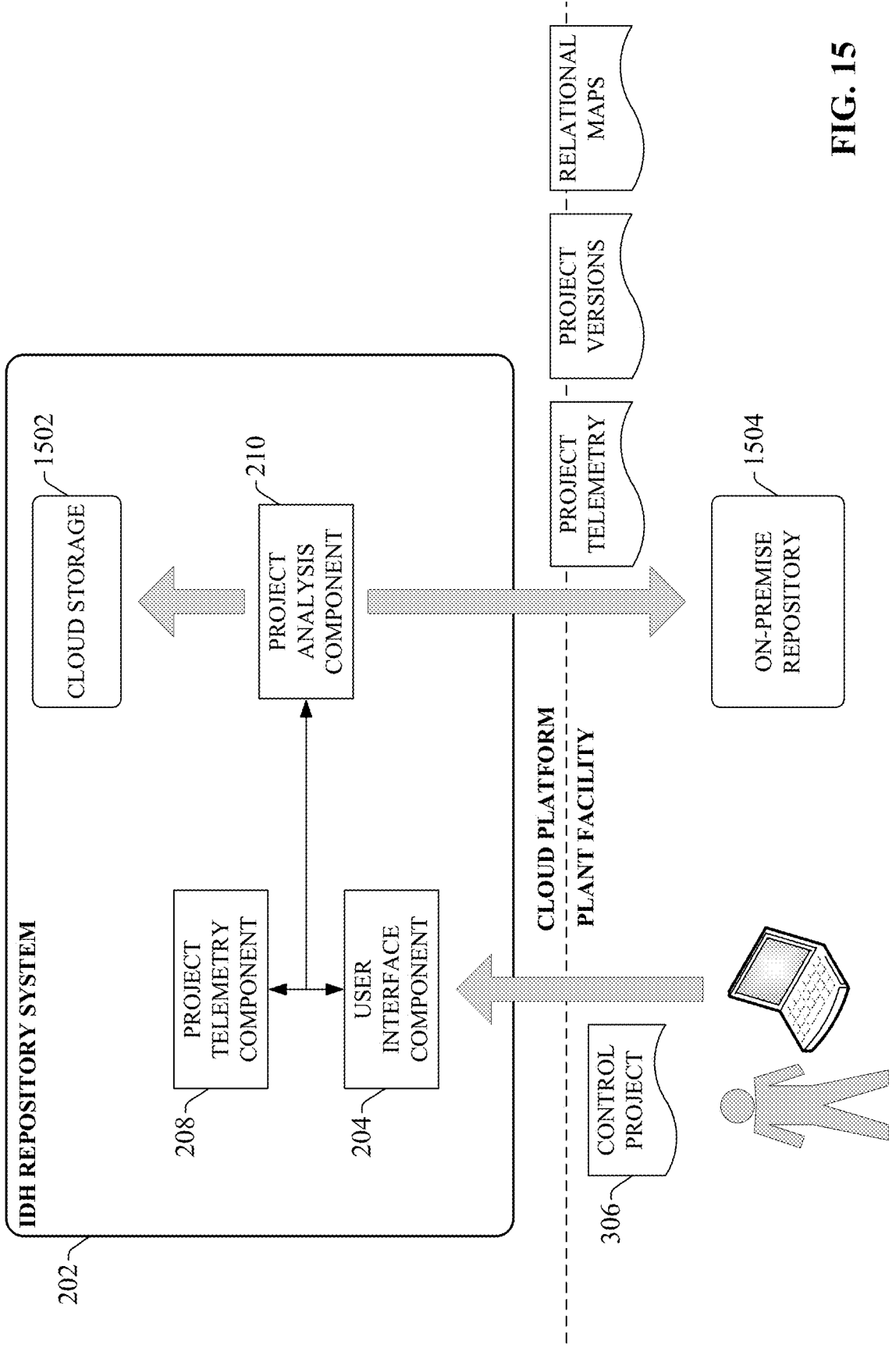
FIG. 15 is a diagram illustrating alternative storage options for customers' project data offered by the IDH repository system.

FIG. 15 is a diagram illustrating alternative project storage options for customers' project data offered by the IDH repository system. To offer users flexibility in terms of where their project data is stored, some embodiments of the IDH repository system 202 can allow customers to specify whether they wish to store their project information—including versions of control projects 306, project telemetry data, project versions, relational map information, analytic results, or other project data—on the system's backend cloud-based storage 1502 or, alternatively, to store this product data on their own on-premise repository 1504 (e.g., a Git repository residing in the customer's facility). This allows customers to store their backup project data locally if desired, while still being allowed to apply the repository system's analytic and mappings services to their project data regardless of where the project data is stored. To allow for local storage of project data, the repository system 202 can include interface tools that link the system's analytic tools into the customers' own private repository 1504. The system 202 can also allow customers to select which subsets of their proprietary project data should be stored in their on-premise repository 1504, while allowing other sets of project data to be stored on the repository system's cloud-based storage 1502.

FIGS. 16-17 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 16 illustrates an example methodology 1600 for rendering data dependencies within an industrial automation system. Initially, at 1602, a control project is received at a cloud-based IDH repository system. The control project can be uploaded by a customer (e.g., authorized personnel at a plant facility at which the control project operates) for archival or analysis purposes, or automatically archived to the repository system as part of a backup-and-restore procedure. The control project comprises control programming and device configuration data for programming and configuring an industrial control system at the plant facility.

At 1604, project telemetry data is extracted from the control project by the repository system. This project telemetry data can comprise, for example, an inventory of devices that make up the control system, I/O utilization of the devices, network resources (e.g., communication bandwidth) utilized by the control system, predicted device lifecycle information, an expected frequency of operating cycles of one or more of the devices, an expected processing load on one or more of the devices as a result of executing the control project, an expected amount of device memory consumed as a result of executing the control project, a subset of available features of a device that are being utilized by the control project, or other such telemetry.

At 1606, a dependency mapping between data items produced and consumed by devices that make up the industrial control system is determined based on analysis of the project telemetry data generated at step 1604. The dependency mapping identifies data tags whose values are generated, or produced, by a device, and also identifies which other data tags of other devices reference, or consume, the values of these data tags.

At 1608, a determination is made as to whether a selection of a device of the automation system that is a producer or a consumer of data is received. This selection can be made, for example, via interaction with a graphical interface that renders a list or map of the devices that make up the automation system, as determined based on the analysis of the control project. If a selection of a device is made (YES at step 1608), the methodology proceeds to step 1610, where a relational dependency map is generated and rendered that graphically depicts the devices and dependency relationships between the data items relative to the selected devices, as determined at step 1606. The relational dependency map can depict icons representing the devices of the automation system to be monitored and controlled by the control project—e.g., industrial controllers 118, safety relays, HMIs, etc.—and their associated data tags, and graphically depicts data producers and data consumers from the standpoint of the selected device. For example, the graphical map may render a device icon representing the selected device, as well as data tag icons representing the data tags produced or consumed by the selected device. The map can also render data tag icons representing data tags of other devices that either produce data referenced by the selected device's data tags or consume data from the selected device's data tags, as well as graphical lines between data tags having a produce/consume relationship.

FIG. 17 illustrates an example methodology 1700 for graphically depicting differences in data dependencies between an as-designed industrial control system and an as-built control system. Initially, at 1702, an as-designed dependency map is generated based on analysis of an as-designed control project comprising control programming and device configuration data for programming and configuring an industrial control system. This as-designed relational dependency map can be generated, for example, by a cloud-based IDH repository system to which the control project is submitted for storage and analysis, and can graphically depict dependency relationships between data items produced and consumed by devices that make up the control system (similar to the map generated at step 1610 of methodology 1600).

At 1704, an as-built relational dependency map is generated based on analysis of real-time operational data from an as-built version of the industrial control system. To generate this as-built relational dependency map, the IDH repository system can create an updated map by modifying the as-designed map based on real-time operational or status information collected from the installed control system during runtime. This collected runtime data can be obtained from industrial controllers, telemetry devices, sensors, or other data sources involved in monitoring and controlling the automation system.

At 1706, the as-designed map generated at step 1702 and the as-built map generated at step 1704 are compared. At 1708, a determination is made, based on the comparison, as to whether there are differences in the data dependencies of the as-designed and as-built maps. This may be the case, for example, if the physical installation of the automation system to be monitored and controlled by the control project necessitated modifications to the original control design, in terms of the devices used or their connectivity.

If there are differences between the as-designed and as-built maps (YES at step 1708), the methodology proceeds to step 1710, where a differential relational dependency map is generated based on the comparison. The differential relational dependency map can depict similar information to that of the as-designed or as-built maps, but additionally indicates deviations between the as-designed and as-built maps. These deviations can be identified, for example, using color-coded indicators to identify as-built data dependencies that have changed from the as-designed relationships. Previous as-designed dependencies that are no longer valid in the as-built design can also be displayed on the differential map using a different graphical format from that used for the valid dependencies.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, Open Platform Communications Unified Architecture (OPC-UA), and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 18:
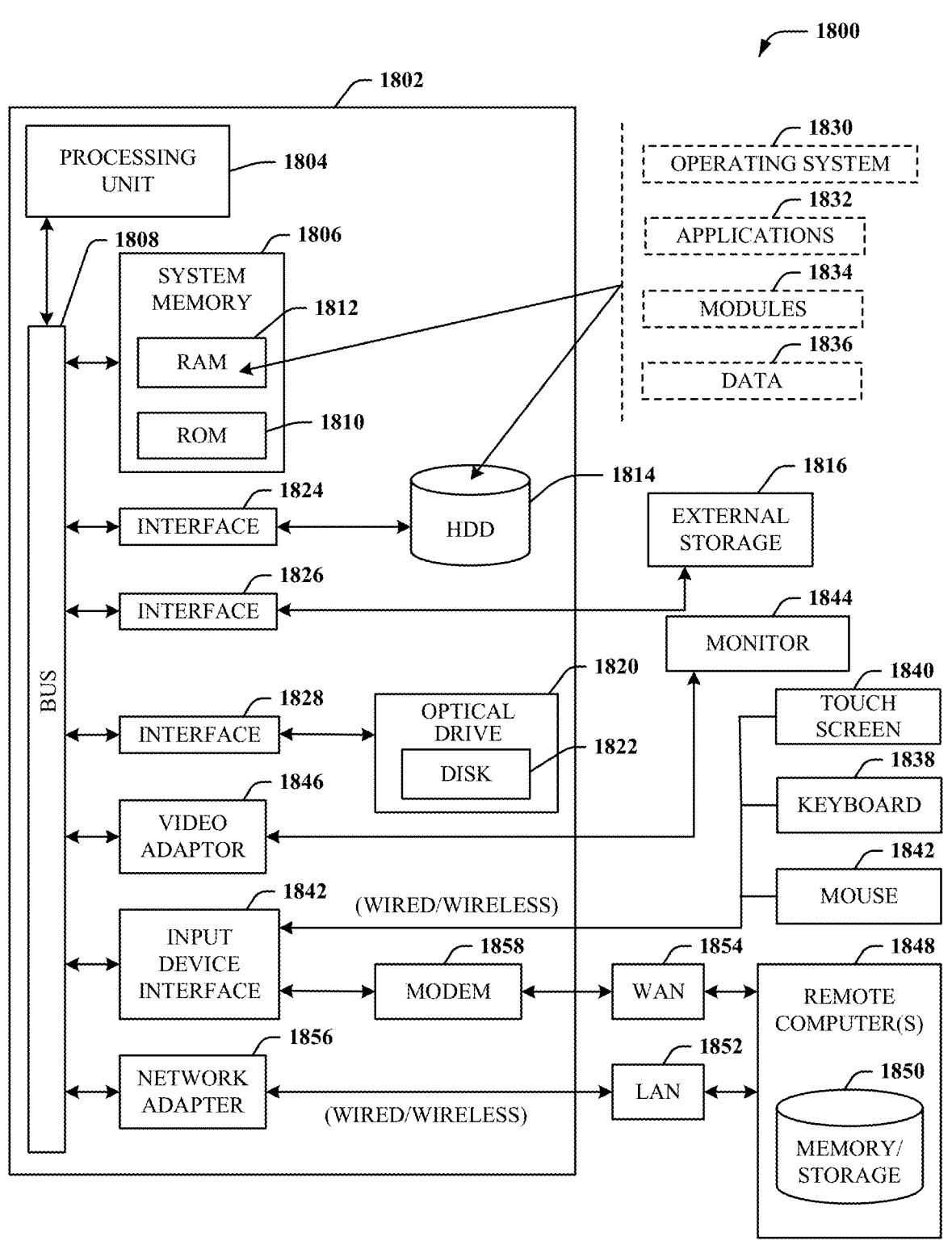
FIG. 18 is an example computing environment.
Figure 19:
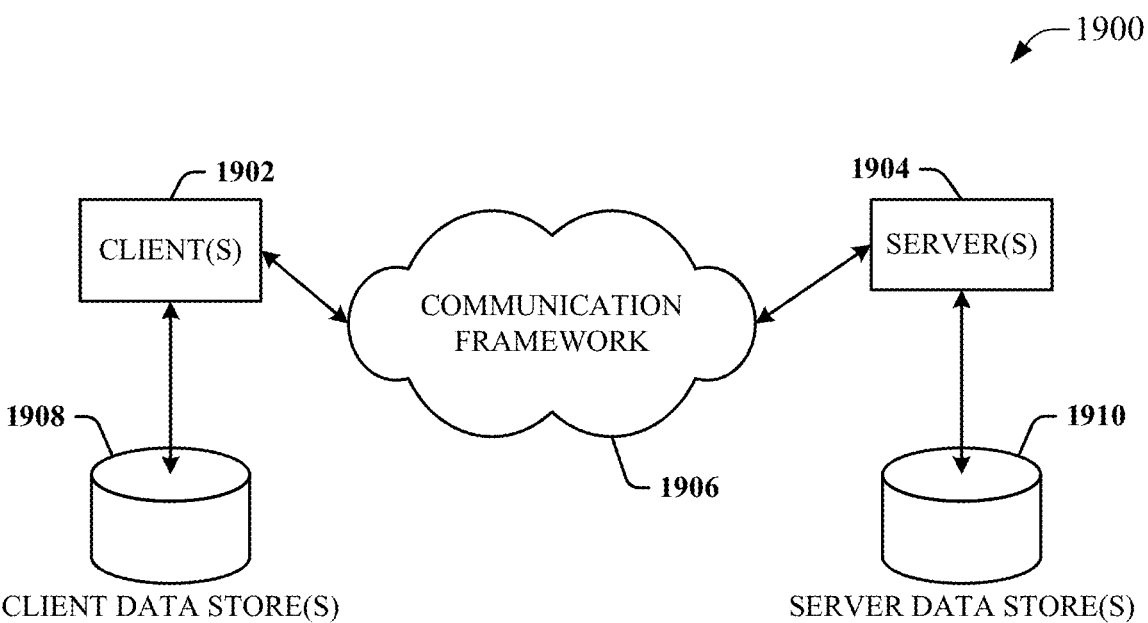
FIG. 19 is an example networking environment.

In order to provide a context for the various aspects of the disclosed subject matter, FIGS. 18 and 19 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and an optical disk drive 1820 (e.g., which can read or write from a CD-ROM disc, a DVD, a BD, etc.). While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and optical disk drive 1820 can be connected to the system bus 1808 by an HDD interface 1824, an external storage interface 1826 and an optical drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the .NET framework, for application programs 1832. Runtime environments are consistent execution environments that allow application programs 1832 to run on any operating system that includes the runtime environment. Similarly, operating system 1830 can support containers, and application programs 1832 can be in the form of containers, which are lightweight, standalone, executable packages of software that include, e.g., code, runtime, system tools, system libraries and settings for an application.

Further, computer 1802 can be enable with a security module, such as a trusted processing module (TPM). For instance with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1844 or other type of display device can be also connected to the system bus 1808 via an interface, such as a video adapter 1846. In addition to the monitor 1844, a computer typically includes other peripheral output devices (not shown), such as speakers, printers, etc.

The computer 1802 can operate in a networked environment using logical connections via wired and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1850 is illustrated. The logical connections depicted include wired/wireless connectivity to a local area network (LAN) 1852 and/or larger networks, e.g., a wide area network (WAN) 1854. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1852 through a wired and/or wireless communication network interface or adapter 1856. The adapter 1856 can facilitate wired or wireless communication to the LAN 1852, which can also include a wireless access point (AP) disposed thereon for communicating with the adapter 1856 in a wireless mode.

When used in a WAN networking environment, the computer 1802 can include a modem 1858 or can be connected to a communications server on the WAN 1854 via other means for establishing communications over the WAN 1854, such as by way of the Internet. The modem 1858, which can be internal or external and a wired or wireless device, can be connected to the system bus 1808 via the input device interface 1842. In a networked environment, program modules depicted relative to the computer 1802 or portions thereof, can be stored in the remote memory/ storage device 1850. It will be appreciated that the network connections shown are example and other means of establishing a communications link between the computers can be used.

When used in either a LAN or WAN networking environment, the computer 1802 can access cloud storage systems or other network-based storage systems in addition to, or in place of, external storage devices 1816 as described above. Generally, a connection between the computer 1802 and a cloud storage system can be established over a LAN 1852 or WAN 1854 e.g., by the adapter 1856 or modem 1858, respectively. Upon connecting the computer 1802 to an associated cloud storage system, the external storage interface 1826 can, with the aid of the adapter 1856 and/or modem 1858, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 19 is a schematic block diagram of a sample computing environment 1900 with which the disclosed subject matter can interact. The sample computing environment 1900 includes one or more client(s) 1902. The client(s) 1902 can be hardware and/or software (e.g., threads, processes, computing devices). The sample computing environment 1900 also includes one or more server(s) 1904. The server(s) 1904 can also be hardware and/or software (e.g., threads, processes, computing devices). The servers 1904 can house threads to perform transformations by employing one or more embodiments as described herein, for example. One possible communication between a client 1902 and servers 1904 can be in the form of a data packet adapted to be transmitted between two or more computer processes. The sample computing environment 1900 includes a communication framework 1906 that can be employed to facilitate communications between the client(s) 1902 and the server(s) 1904. The client(s) 1902 are operably connected to one or more client data store(s) 1908 that can be employed to store information local to the client(s) 1902. Similarly, the server (s) 1904 are operably connected to one or more server data store(s) 3810 that can be employed to store information local to the servers 3804.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
   a memory that stores executable components; and
   a processor, operatively coupled to the memory, that executes the executable components, the executable components comprising:
   a user interface component configured to receive, via a cloud platform, an industrial control project comprising at least a configuration file of an edge gateway device or instance;
   a project telemetry component configured to generate project telemetry data based on analysis of the industrial control project; and
   a project analysis component configured to determine, based on analysis of the project telemetry data, dependencies between the edge gateway device or instance and data tags of industrial devices that connect to the edge gateway device or instance,
   wherein the user interface component is further configured to render, on a client device, a relational dependency map that graphically displays connections between the edge gateway device and the data tags based on the dependencies.

2. The system of claim 1, wherein the project analysis component is configured to store the industrial control project on either of cloud-based storage associated with the system or an on-premise repository associated with an owner of the industrial control project based on storage preference data submitted by the customer.

3. The system of claim 1, wherein the relational dependency map is a first relational dependency map, the industrial control project further comprises control programming and device configuration data that, in response to execution on one or more industrial devices, facilitate monitoring and control of an industrial automation system, the project telemetry data defines characteristics of the one or more industrial devices based on the analysis, the project analysis component is further configured to determine, based on the analysis of the project telemetry data, dependencies between entities that make up the industrial automation system, and the user interface component is further configured to render, on the client device, a second relational dependency map that graphically displays the dependencies between the entities.

4. The system of claim 3, wherein the dependencies between the entities comprise at least one of relationships between data tags of a specified data type defined in the industrial control project, relationships between devices of the industrial automation system, access gearing relationships, relationships between motion axes of a motion system controlled by the industrial control project, relationships between add-on-instructions defined by the industrial control project, or relationships between automation objects defined in the industrial control project.

5. The system of claim 3, wherein the second relational dependency map graphically displays a communication link between a human-machine interface terminal and one or more industrial controllers associated with the industrial automation system.

6. The system of claim 3, wherein the second relational dependency map graphically displays connections between respective points of an I/O module of an industrial controller and one or more devices that provide data to the respective I/O points or consume data output by the respective I/O points.

7. The system of claim 3, wherein the second relational dependency map renders icons representing the entities, and further renders a connective line between pairs of the entities having a dependency relationship.

8. The system of claim 3, wherein the project telemetry data comprises at least one of network configuration information, device inventory information identifying data producing and data consuming devices associated with the industrial automation system, an I/O module configuration of an industrial controller, or identities of industrial equipment connected to I/O modules of an industrial controller.

9. The system of claim 3, further comprising a device interface component configured to receive runtime data from the one or more industrial devices during operation of the industrial automation system, wherein the project analysis component is further configured to determine updated dependencies between the entities based on analysis of the runtime data, and the user interface component is further configured to render an as-built version of the second relational dependency map that graphically displays the updated dependencies.

10. The system of claim 3, further comprising a device interface component configured to receive runtime data from the one or more industrial devices during operation of the industrial automation system, wherein the user interface component is further configured to populate the second relational dependency map with live status information representing current statuses of the entities obtained from the runtime data.

11. A method, comprising:

receiving, by a system comprising a processor via a cloud platform, an industrial control project comprising at least a configuration file of an edge gateway device or instance;

generating, by the system, project telemetry data based on analysis of the industrial control project;

determining, by the system based on analysis of the project telemetry data, dependencies between the edge gateway device or instance and data tags of industrial devices that connect to the edge gateway device or instance; and rendering, by the system on a client device, a relational dependency map that graphically displays connections between the edge gateway device and the data tags based on the dependencies.

12. The method of claim 11, wherein the relational dependency map is a first relational dependency map, the industrial control project further comprises at least control programming and device configuration data that, in response to execution on one or more industrial devices, facilitate monitoring and control of an industrial automation system, the project telemetry data defines characteristics of the one or more industrial devices identified based on the analysis, the determining further comprises determining, based on the analysis of the project telemetry data, dependencies between entities that make up the industrial automation system, and the method further comprises rendering, by the system on the client device, a second relational dependency map that graphically displays the dependencies between the entities.

13. The method of claim 12, wherein the entities comprise at least one of data tags of a specified data type defined in the industrial control project, devices of the industrial automation system, access gearings, motion axes of a motion system controlled by the industrial control project, add-on-instructions defined by the industrial control project, or automation objects defined in the industrial control project.

14. The method of claim 12, wherein the rendering of the second relational dependency map comprises graphically displaying a connecting line between a first icon representing a human-machine interface and a second icon representing an industrial controller, the connecting line representing a communication link between the human-machine interface and the industrial controller identified based on the analysis of the project telemetry data.

15. The method of claim 12, wherein the rendering of the second relational dependency map comprises graphically displaying connections between respective points of an I/O module of an industrial controller and one or more devices that provide data to the respective I/O points or consume data that is output by the respective I/O points.

16. The method of claim 12, wherein the rendering of the second relational dependency map comprises:

rendering icons representing the entities, and rendering a connective line between pairs of the entities having a dependency relationship.

17. The method of claim 12, wherein the project telemetry data comprises at least one of network configuration information, device inventory information identifying data producing and data consuming devices associated with the industrial automation system, an I/O module configuration of an industrial controller, or identities of industrial equipment connected to I/O modules of an industrial controller.

18. The method of claim 12, further comprising:

receiving, by the system, runtime data from the one or more industrial devices during operation of the industrial automation system, determining, by the system, updated dependencies between the entities based on analysis of the runtime data, and rendering, by the system, an as-built version of the second relational dependency map that graphically displays the updated dependencies.

19. A non-transitory computer-readable medium having stored thereon instructions that, in response to execution, cause a system comprising a processor to perform operations, the operations comprising:

receiving, via a cloud platform, an industrial control project comprising at least a configuration file of an edge gateway device or instance;

generating project telemetry data based on analysis of the industrial control project;

determining, based on analysis of the project telemetry data, dependencies between the edge gateway device or instance and data tags of industrial devices that connect to the edge gateway device or instance; and displaying, on a client device, a relational dependency map that graphically displays connections between the edge gateway device and the data tags based on the determining.

20. The non-transitory computer-readable medium of claim 19, wherein the operations further comprise storing the industrial control project on either of cloud-based storage associated with the system or an on-premise repository associated with an owner of the industrial control project based on storage preference data submitted by the customer.

* * * * *